(12) United States Patent
Nolan et al.

(10) Patent No.: US 10,516,738 B2
(45) Date of Patent: Dec. 24, 2019

(54) SENSOR LIFECYCLE MANAGEMENT SYSTEM

(71) Applicant: Intel Corporation, Santa Clara, CA (US)

(72) Inventors: Keith W. Nolan, Mullingar (IE); Mark Kelly, Leixlip (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/755,945

(22) PCT Filed: Sep. 25, 2015

(86) PCT No.: PCT/US2015/052187
§ 371 (c)(1),
(2) Date: Feb. 27, 2018

(87) PCT Pub. No.: WO2017/052582
PCT Pub. Date: Mar. 30, 2017

(65) Prior Publication Data
US 2018/0288158 A1    Oct. 4, 2018

(51) Int. Cl.
*H04L 29/08* (2006.01)
*H04L 12/26* (2006.01)
*G05B 19/042* (2006.01)

(52) U.S. Cl.
CPC .......... *H04L 67/12* (2013.01); *G05B 19/0428* (2013.01); *H04L 43/065* (2013.01); *G05B 2219/25166* (2013.01)

(58) Field of Classification Search
CPC .... G05B 19/0428; H04L 43/065; H04L 67/12
See application file for complete search history.

(56) References Cited

U.S. PATENT DOCUMENTS 5,939,609 A * 8/1999 Knapp ................... G01D 21/02
73/1.01
6,546,294 B1 * 4/2003 Kelsey ............... G05B 23/0283
348/231.3

(Continued)

FOREIGN PATENT DOCUMENTS

CN    102868972 A    1/2013
CN    107667360 A    2/2018

(Continued)

OTHER PUBLICATIONS

International Preliminary Report on Patentability and Written Opinion issued in PCT Application No. PCT/US2015/052187, dated Apr. 5, 2018, 8 pages.

(Continued)

*Primary Examiner* — Nimesh G Patel
(74) *Attorney, Agent, or Firm* — Grossman, Tucker, Perreault & Pfleger, PLLC

(57) ABSTRACT

One embodiment provides an apparatus. The apparatus includes a sensor module. The sensor module includes a sensor; and a sensor controller. The sensor controller is to enumerate the sensor to a sensor processing unit in response to being powered on. The enumerating includes communicating enumeration data to the sensor processing unit. The enumeration data includes one or more of a sensor name, a sensor manufacturer name, a sensor serial number, a hardware version, a firmware version, and/or one or more sensor characteristics. The sensor controller is further to monitor operation of the sensor and to provide sensor lifecycle information to the sensor processing unit over the lifecycle of the sensor.

15 Claims, 6 Drawing Sheets

(56) References Cited

U.S. PATENT DOCUMENTS

| | | | |
|---|---|---|---|
| 7,197,370 B1 | 3/2007 | Ryskoski | |
| 2008/0219520 A1 | 9/2008 | Mainguet | |
| 2009/0154299 A1* | 6/2009 | Solhjoo | G07C 3/00 |
| | | | 368/108 |
| 2010/0168911 A1* | 7/2010 | Jung | B25J 9/1658 |
| | | | 700/245 |
| 2012/0089369 A1 | 4/2012 | Abuzeni et al. | |
| 2012/0105214 A1 | 5/2012 | Sanders et al. | |
| 2013/0276144 A1* | 10/2013 | Hansen | G06F 21/60 |
| | | | 726/29 |
| 2015/0281409 A1* | 10/2015 | Tatiya | G06F 13/385 |
| | | | 709/217 |
| 2016/0378153 A1 | 12/2016 | Kelly et al. | |

FOREIGN PATENT DOCUMENTS

| | | |
|---|---|---|
| EP | 2573742 A1 | 3/2013 |
| GB | 2513976 A | 11/2014 |
| TW | 201712480 A | 4/2017 |
| WO | 2016-209371 A1 | 12/2016 |
| WO | 2017-052582 A1 | 3/2017 |

OTHER PUBLICATIONS

International Search Report and Written Opinion issued in PCT Application No. PCT/US2015/052187, dated Jun. 24, 2016, 9 pages.

Extended European Search Report received in European Patent Application No. EP15904920, dated Apr. 11, 2019, 9 pages.

* cited by examiner

SENSOR LIFECYCLE MANAGEMENT SYSTEM

FIELD

The present disclosure relates to a system, in particular to, a sensor lifecycle management system.

BACKGROUND

A sensor array may include a plurality of sensors, with each sensor positioned at a respective location. One or more of the respective sensor locations may be adjacent each other and/or one or more of the sensor locations may be distant from one another. Sensor arrays may be configured to monitor a wide array of parameters in sectors that include environmental, industrial, residential, military and health sectors. For example, parameters may include, but are not limited to, weather conditions, air quality, household goods, stock inventory, and equipment and tools. The monitoring, and thus the sensors, may be spread across wide geographical areas. For example, at least some Internet of Things (IoT) deployments may include one or more sensor array(s).

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
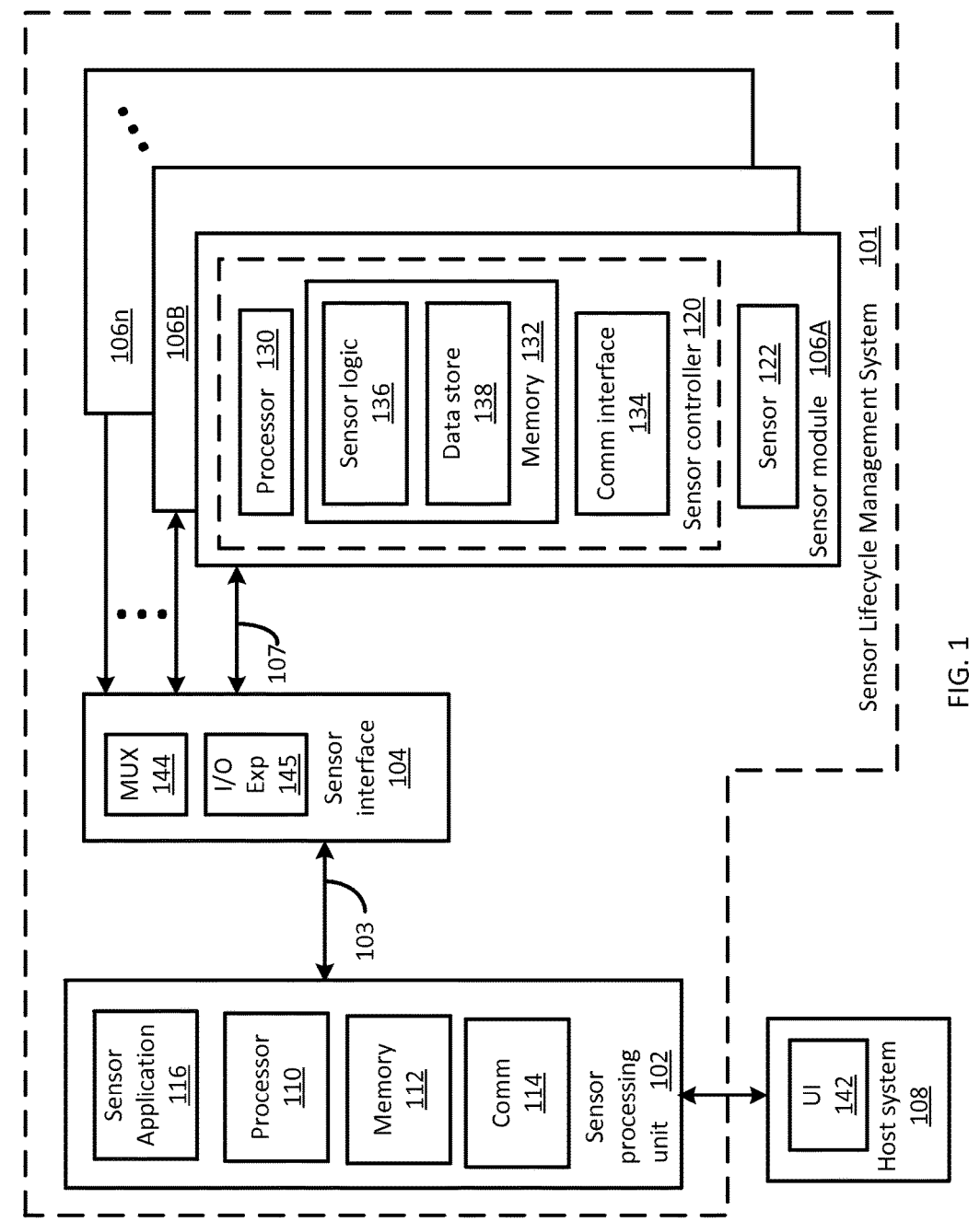
FIG. 1 illustrates a functional block diagram of a system, including a sensor lifecycle management system consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

Operationally, sensors may have a limited lifespan. Typically, vendor-specific methods are utilized to configure one or more sensor(s) and to connect the sensor(s) to a host system configured to receive sensor data. Thus, a customized interface may be required in order to couple to each sensor. Sensors may fail and/or may suffer from faults that may or may not be visible to the host system. In other words, a faulty sensor may continue to provide data even though the data is erroneous. The host system that receives the erroneous data may rely on the data, not recognizing that the data is erroneous. Further, the host system may be unaware that a sensor has been coupled to the host system unless there is action by a user, i.e., a system administrator, that informs the host system. The host system may be further configured to poll the sensor to read data that may or may not be available. In other words, a sensor with data to report may have to wait to report the data, a sensor that isn't ready may provide erroneous data or a sensor without data to report may be polled thereby increasing communication overhead.

Generally, this disclosure relates to a sensor lifecycle management system. An apparatus, method and/or system are configured to manage a respective lifecycle of each of a plurality of sensors. A sensor lifecycle begins with an initial deployment of the sensor, continues through the life of the sensor and ends with the permanent removal, i.e., retirement, of the sensor. Each sensor is configured to provide enumeration information (i.e., enumeration data), e.g., at power up, and lifecycle information (i.e., lifecycle data) during its respective lifecycle. Enumeration information includes details related to the identity of the sensor and/or one or more sensor operational characteristic(s). Lifecycle information includes indicators related to the status, i.e., state, of the sensor (e.g., unknown, ready, not available, no data, initializing, access denied and/or error).

A sensor module, consistent with the present disclosure, includes a sensor controller and a sensor. The sensor controller is configured to enumerate the sensor module and/or the sensor to a sensor processing unit. The sensor controller is further configured to monitor operation of the sensor and to provide sensor lifecycle information to the sensor processing unit over the lifecycle of the sensor. The sensor is configured to capture measurement data corresponding to a value of an environmental parameter and to provide an electrical signal as output (i.e., sensor data) that is related to the measurement data. The sensor controller is configured to receive the sensor data and to report associated sensor data to the sensor processing unit.

The sensor controller is configured to enumerate the sensor module in response to powering on. For example, the sensor controller may be configured to inform the sensor processing unit and/or a host system that it has been connected and what type of sensor it is. The sensor controller may be further configured to inform the sensor processing unit that it is preparing to make observations, and that it is has performed a sensor reading and is ready to dispatch its sensor data. The sensor data may be processed by the sensor controller prior to dispatch. For example, the sensor data may be averaged, i.e., smoothed, prior to dispatch.

The sensor controller is configured to utilize a communication protocol configured to enable the sensor controller to communicate enumeration data, lifecycle data and/or sensor data to the sensor processing unit. The communication protocol may comply and/or be compatible with a USB (Universal Serial Bus) HID (Human Interface Device) protocol, as described herein. A communications link between a sensor module and a sensor processing unit may comply and/or be compatible with one or more serial communications protocols, e.g., an I2C (Inter-integrated circuit) serial communication protocol, as described herein, and/or variant(s) thereof. Compatibility with the USB HID protocol and the I2C protocol is configured to facilitate integration into IoT sensor-based devices and applications.

Thus, operation of one or more sensor arrays may be facilitated. Previously unknown sensors and/or sensor modules may be coupled to a host system and, through enumeration, may be recognized. Further, sensor operation may be monitored throughout the deployment period thus avoiding inappropriate action based on erroneous data. For example, a gradual decline in effectiveness and/or a sensor breach of known-good limits (e.g., overgassing, sensor membrane saturation) may be detected and communicated. A sensor module may be further configured to perform configurable processing on raw sensor observations (e.g., smoothing, automatic re-zeroing to ensure correct operation in unattended deployment scenarios).

A lifecycle management system, consistent with the present disclosure, is configured to allow a sensor module and associated sensor to proceed from initial power-on to a normal sensor observation data gathering phase. The sensor modules are configured to report lifecycle information including, for example, state and error information to a sensor application, thus, enabling the sensor application to take action, e.g., reset a sensor, decommission the sensor, and/or alert a user.

FIG. 1 illustrates a functional block diagram of a system 100, including a sensor lifecycle management system 101 consistent with several embodiments of the present disclosure. The system 100 includes the sensor lifecycle management system 101 and may further include a host system 108. Sensor lifecycle management system 101 includes a sensor processing unit 102, a sensor interface 104 and a plurality of sensor modules 106A, 106B, . . . , 106n, e.g., sensor module 106A. In the following, although sensor module 106A is described, such description applies equally to sensor modules 106A, 106B, . . . , 106n. Thus, reference to sensor module 106A may be understood as referring to any of sensor modules 106A, 106B, . . . , 106n.

The host system 108 may include a user interface (UI) 142. The host system 108 is configured to receive enumeration information, lifecycle information and sensor data from one or more sensor processing units, e.g., sensor processing unit 102. The host system 108 and/or sensor processing unit 102 may be configured to display the received information and data using UI 142 and/or may be configured to receive user input via UI 142. The user interface 142 may thus include, but is not limited to, a display (e.g., a touch sensitive display), a keypad, a keyboard, a mouse, etc.

The sensor processing unit 102 includes a processor 110, a memory 112 and a communication interface 114 and may include a sensor application 116. Sensor processing unit 102 and, e.g., sensor application 116, may be configured to provide enumeration information, lifecycle information and sensor data to host system 108. The enumeration information, lifecycle information and sensor data may be formatted to facilitate ease of viewing by a user. For example, enumeration information, lifecycle information and/or sensor data for a plurality of sensors may be provided to a user, e.g., displayed on UI 142, in a table format. In another example, sensor data may be converted to a scientific notation number format, e.g., to facilitate user understanding.

Enumeration information (i.e., enumeration data) may include, but is not limited to, a sensor name, a sensor manufacturer name, a sensor serial number, a hardware version, a firmware version, and/or one or more sensor characteristics. Sensor characteristics may include, but are not limited to, information related to a type of sensor reading (e.g., provides parts per billion readings), whether the sensor requires a warm-up time, a frequency at which a sensor captures data (i.e., the frequency at which a sensor takes a reading), and/or whether sensor data is to be reported when available or at preset time intervals.

Lifecycle information may include, but is not limited to, the sensor identifier, e.g., the sensor name, and a sensor status indicator. Sensor status indicators include, but are not limited to, state unknown, ready, not available, no data, initializing, access denied and error. For example, sensor status ready is configured to indicate that the sensor module is ready to dispatch sensor observation information, i.e., sensor data. In another example, sensor error is configured to indicate that the sensor has encountered an error and/or fault state.

Processor 110 may include, but is not limited to, a microprocessor, a microcontroller, an application specific integrated circuit (ASIC), application specific instruction processor (ASIP), etc. Memory 112 may be configured to store sensor application 116 and/or enumeration information, lifecycle information and/or sensor data for one or more of a plurality of sensors and/or a plurality of sensor modules.

Communication interface 114 may comply and/or be compatible with one or more, wired and/or wireless, communication protocols. Communication interface 114 is configured to couple sensor processing unit 102 to host system 108. Communication interface 114 may be further configured to couple sensor processing unit 102 to sensor interface 104 via communication link 103. The communication interface 114 and/or communication link 103 may be configured to comply and/or be compatible with a serial communication protocol. For example, the serial communication protocol may correspond to an I2C communication protocol or an SPI communication protocol, as described herein. Communication link 103 may be configured to carry one or more frames that may comply and/or are compatible with a USB HID protocol, as described herein. Each frame may include, for example, control information (e.g., start bit, stop bit, etc.) and a payload that contains enumeration information, lifecycle information and/or sensor data.

Sensor interface 104 is configured to couple sensor processing unit 102 to a plurality of sensor modules 106A, 106B, . . . , 106n, e.g., sensor module 106A. Sensor interface 104 may include a multiplexer MUX 144 and an Input/Output (I/O) Expander 145. Sensor processing unit 102 and, e.g., sensor application 116, may be configured to control MUX 144 to select one sensor module, e.g., sensor module 106A, of the plurality of sensor modules 106A, 106B, . . . , 106n for communication operations. For example, sensor processing unit 102 may be configured to control MUX 144 by selecting a MUX channel corresponding to an address associated with the selected sensor module. The address may correspond to a slot in sensor interface 104 configured to receive a sensor module, e.g., sensor module 106A. As used herein, a slot corresponds to a connector and/or a port configured to receive a sensor module. The address may be determined, for example, by reading a stored value from the I/O expander 145 via communications link 103. Each binary value in this stored value is associated with a sensor slot. The sensor module address may then be determined via a lookup table using the bitfield information contained in the information retrieved from the IO expander 145. The selected sensor module 106A, may then be coupled to sensor processing unit 102 via communication links 103, 107 and MUX 144.

The I/O expander, e.g., I/O expander 145 is configured to connect to the sensor interrupt lines, that may be included in communication link 107. The I/O expander is configured to read to determine which sensor module(s) have asserted an interrupt, i.e., which sensor modules are signaling that they require attention. The MUX, e.g., MUX 144, is configured to communicate with the sensors, i.e., sensor modules 106A, 106B, . . . , 106n, via communication link 107. The communication may comply and/or be compatible with the I2C protocol, as described herein. The MUX is configured to provide a 1:N mapping between sensor modules and sensor interface 104. In other words, a single I2C input channel and N I2C output channels configured to support at least N sensors. Thus, in order to address a specific sensor, the channel that the desired sensor is connected to may be selected.

Sensor module 106A includes a sensor controller 120 and at least one sensor, e.g., sensor 122. Sensor controller 120 includes a processor 130, memory 132 and a communication interface 134. Sensor controller 120 is configured to capture sensor data from sensor 122. As used herein, sensor data corresponds to an output from a sensor related to measurement data, i.e., related to a sensed environmental parameter value. Sensor data may include one or more voltage values and/or one or more current values. For example, sensor 122 may correspond to and/or may include a transducer configured to convert measurement data into an electrical value, e.g., sensor data.

Memory 132 may be configured to store sensor logic 136 and data store 138. Data store 138 is configured to contain enumeration information (i.e., enumeration data), lifecycle information (i.e., lifecycle data) and sensor data. Processor 130 and/or sensor controller 120 may include, but are not limited to, a microprocessor, a microcontroller, an application specific integrated circuit (ASIC), application specific instruction processor (ASIP), etc. For example, a sensor controller 120 that includes processor 130, memory 132 and communication interface 134 may correspond to a microcontroller. Sensor controller 120 may further include interface circuitry, e.g., an analog-to-digital converter (ADC), configured to facilitate capturing, receiving and or acquiring sensor data from sensor 122.

Communication interface 134 may be further configured to couple sensor module 106A to the sensor interface 104 via communication link 107. For example, communication interface 134 and/or communication link 107 may comply and/or be compatible with a serial, i.e., I2C, communication protocol, as described herein.

Sensor controller 120 and/or sensor logic 136 may be configured to capture sensor data and may be further configured to store a representation (e.g., a corresponding digital value) of captured sensor data to data store 138. Sensor logic 136 is further configured to manage communication between sensor module 106A, sensor interface 104 and ultimately sensor processing unit 102. For example, sensor logic 136 may be configured to receive commands, queries, requests and/or data from, e.g., sensor application 116, via sensor interface 104. In another example, sensor logic 136 may be configured to control communication interface 134 to transmit interrupts, enumeration information, lifecycle information, and/or sensor data to sensor interface 104 and/or sensor processing unit 102, e.g., to sensor application 116.

Communication between sensor processing unit 102, sensor interface 104 and sensor module 106A via communication links 103, 107 may comply and/or may be compatible with a USB HID communication protocol, as described herein. Information and data communicated may be organized into one or more frames, that each includes a payload. The information and data included in each payload may be contained in a descriptor that is organized according to a corresponding byte frame format, e.g., a byte address field format. Each frame includes a sequence of bytes. Each byte frame format may define a plurality of fields with each field corresponding to one or more bit(s) in a byte and/or one or more byte(s). Thus, each field may have an associated defined position in the frame (indicated by the byte address field), a defined size (i.e., a length in bits or bytes) and may be configured to contain defined, i.e., specified, information and/or data. Each byte frame format may provide an associated defined format for a corresponding descriptor and/or a corresponding report (e.g., descriptor byte frame, report frame). A corresponding descriptor and/or corresponding report may then be formatted according to the field definitions included in the byte frame format. Thus, each descriptor and/or associated byte frame format is configured to facilitate communication of information and/or data between sensor module 106A and sensor processing unit 102 and/or sensor interface 104. The format of the descriptor may be configured to comply and/or be compatible with the USB HID communication protocol.

Each frame may also have an associated defined format configured to facilitate communication between sensor processing unit 102, sensor interface 104 and sensor module 106A. The format of the frame may be configured to comply and/or be compatible with an I2C communication protocol. For example, in addition to the payload (i.e., the data), the byte frame format may include a read or write operation byte, start bit(s), stop bit(s) and/or address bits.

In operation, one or more of sensor modules 106A, 106B, . . . , 106n, e.g., sensor module 106A, may be coupled to sensor interface 104. As a result of the coupling and/or in response to a command from, for example, sensor application 116, power may be applied to sensor module 106A via communication link 107. A discovery process may then proceed between sensor processing unit 102 and sensor module 106A. A successful discovery process may then include, and/or be followed by, an enumeration phase. The enumeration phase may then be followed by a lifecycle phase, i.e., a reporting phase. The discovery process is configured to alert sensor processing unit 102 that sensor module 106A and/or other sensor modules are coupled to sensor interface 104. The discovery phase may further include determining an associated address for each powered on sensor module. The enumeration phase is configured to identify each sensor module that is coupled to sensor interface 104 and is powered up. Communication between a sensor module, e.g., sensor module 106A, and sensor processing unit 102 may generally be initiated via assertion of an interrupt by sensor module 106A. Sensor processing unit 102 and/or sensor interface 104 may then be configured to handle the interrupt. Thus, asserting an interrupt is configured to alert the sensor processing unit 102 of the presence of sensor module 106A and/or of any pending state changes of sensor module 106A.

Sensor module 106A may be configured to assert an interrupt, e.g., in response to being powered up. Asserting the interrupt is configured to announce the presence of sensor module 106A. In some embodiments, the sensor module may be configured to determine an associated address (i.e., self address resolution) in response to powering on. In response to the interrupt assertion, sensor module 106A may receive a request for an enumeration descriptor, e.g., an HID descriptor. For example, the HID descriptor may be requested by sensor processing unit 102. Table 1 illustrates one example byte frame format for the HID descriptor request descriptor.

TABLE 1

| Byte | Field | Value |
|------|-------|-------|
| 1 | Request Length | 0x04 |
| 2 | HID Usage ID | 0xF5 |

TABLE 1-continued

| Byte | Field | Value |
|------|-------|-------|
| 3 | Random Seed | 0xAB |
| 4 | CRC Byte | 0xXX |

As illustrated in Table 1, the byte frame format for the HID descriptor request includes four fields and each field has length one byte. The first field is configured to contain the request length, four bytes in this example. The second field is configured to contain an HID usage identifier. The HID usage identifier is configured to denote the type of operation requested. For example, 0xF5 corresponds to a HID descriptor read request. The third field is configured to contain a random seed that may be utilized to authenticate sensor module 106A, as described herein. The fourth field is a cyclic redundancy check (CRC) for the HID descriptor request. The value of the CRC byte is related to the values of the first, second, and third bytes. Generally, the CRC byte is the $n^{th}$ byte in an n byte frame and is determined as an exclusive-OR of the preceding n−1 bytes in the frame.

An enumeration descriptor, e.g., HID descriptor, may be provided by sensor module 106A, e.g., sensor controller 120, in response to the request for the HID descriptor. The HID descriptor is configured to provide enumeration information related to sensor module 106A and/or sensor 122 to sensor processing unit 102. Table 2 illustrates one example byte address field format for an HID descriptor, e.g., an initial sensor description report format. The enumeration descriptor may include a fixed part and a variable part. The fixed part may have a fixed length and the variable part may have a variable length.

TABLE 2

| Identifier | Byte Offset | Number of Bytes | Description | |
|------------|-------------|-----------------|-------------|---|
| Number of Sensors | 1 | 1 | Number of physical sensors in a sensor HUB | Fixed Part |
| Authentication Key | 2 | 2 | Authentication Key | |
| HID Protocol Version | 4 | 1 | Version of the HID Protocol | |
| Report Descriptor Length | 5 | 2 | Report Descriptor Length | |
| HID Descriptor Length | 7 | 1 | Total size of the HID descriptor | Variable Part |
| Sensor Name | 8 | 8 | String containing Name of the sensor | |
| Manufacturer | 16 | 6 | String containing name of sensor manufacturer | |
| Serial Number | 22 | 6 | Serial number of the sensor | |
| Hardware Version | 28 | 2 | Sensor module hardware version | |
| Firmware Version | 30 | 2 | Firmware version of the sensor firmware | |
| CRC byte | 32 | 1 | XOR of all of the above bytes | |

The HID descriptor is configured to provide information related to sensor module 106A and to facilitate communication of lifecycle information from sensor module 106A, e.g., during the lifecycle phase. As illustrated in Table 2, the initial sensor description report (i.e., enumeration descriptor) includes a plurality of ordered fields configured to communicate enumeration information. The enumeration information may be grouped into a fixed part and a variable part. The fixed part may include a number of sensors in a sensor hub, an authentication key, an HID protocol version and a report descriptor length. A sensor hub is an interface that is configured to allow a plurality of sensors (i.e., sensor modules) to be accessed via a single sensor slot in order to extend the number of sensors that may be connected to and supported by, e.g., sensor processing unit 102 and sensor interface 104. The variable part may include an HID descriptor length, a sensor name, manufacturer, a serial number, a hardware version and a firmware version for each of the number of the sensors obtained from the number of sensors field in the fixed part of the frame. For more than one sensor, the variable part of the frame may be extended by concatenating sensor enumeration frame information for each sensor.

For example, for a single sensor, the byte address field format for an HID descriptor includes one fixed frame part and one variable frame part. In another example, for two sensors, the byte address field format for an HID descriptor includes one fixed frame part and two variable parts, one variable part for each sensor. The second variable frame part that corresponds to the second sensor is appended to the first variable frame part. Thus, for N sensors, the HID descriptor may then include: Fixed Frame Part|Variable Part 1|Variable Part 2| . . . | Variable Part N, where | corresponds to append.

As illustrated by Table 2, the HID descriptor includes a plurality of fields with a respective position in the descriptor defined by a byte offset, and a size of each field defined by a number of bytes. Table 2 further illustrates an identifier associated with each field, a description associated with each field and an indication whether the field lengths are fixed or variable. A first field has length one byte and is configured to contain the number of sensors, i.e., the number of sensors available in the sensor hub. A second field has length two bytes and is configured to contain the authentication key. The authentication key is a result of an exclusive-OR operation between the random seed provided in the HID descriptor request and the lower two bytes of the sensor serial number. The third field has length one byte and is configured to contain the HID protocol version. The fourth field has length two bytes and is configured to contain a report descriptor length and the fifth field has length one byte and is configured to contain the HID descriptor length. The report descriptor length and the HID descriptor length are configured to support a difference in length between the two types of descriptors. The sixth field has length eight bytes is configured to contain an ASCII (American Standard Code for Information Interchange) string (of up to eight characters) that corresponds to the name of the sensor. Based on the type of sensor, the sensor name ASCII string may include, but is not limited to, TEMPERAT, HUMIDITY, LIGHT, SOUND, CO, NO, NO2, SO2, ETO, PM2P5 or PM10. Thus, TEMPERAT corresponds to a temperature sensor, HUMIDITY corresponds to a humidity sensor, LIGHT corresponds to a light sensor, SOUND corresponds to a sound to sensor, CO corresponds to a carbon monoxide sensor, NO corresponds to a nitrous oxide sensor, NO2 corresponds to a nitrous dioxide sensor, SO2 corresponds to a sulfur dioxide sensor, ETO corresponds to an Ethylene Oxide sensor, PM2P5 corresponds to a particulate matter sensor for particulate above 2.5 micrometers and PM10 corresponds to a particulate matter sensor for particulate above 10 micrometers.

The seventh field has length six bytes and is configured to contain an ASCII string corresponding to the name of the sensor manufacturer. The eighth field has length six bytes and is configured to contain the serial number of the sensor.

The ninth field has length two bytes and is configured to contain the hardware version. For example, the hardware version may correspond to 0x01 and 0x00, where 0x corresponds to hexadecimal. The tenth field has length two bytes and is configured to contain firmware version, e.g., 0x09. The last field has length one byte and is configured to contain a CRC byte. For example, the CRC byte may contain an exclusive-OR result of the contents of fields one through ten.

Thus, the HID descriptor response is configured to enumerate an associated sensor and/or sensor module, e.g., sensor 122 and/or sensor module 106A, as well as provide descriptor, hardware, and firmware information.

Sensor processing unit 102 may then be configured to authenticate sensor module 106A utilizing the received HID descriptor. For example, module 106A may perform an XOR (i.e., exclusive-OR) operation using the random seed bytes sent as part of the HID descriptor request with two bytes of the sensor serial number. The results may then be included in the authentication field of the HID descriptor. A sensor application, e.g., sensor application 116, may then perform authentication by performing a similar XOR operation using the serial number bytes obtained from the sensor and the original random seed bytes. If a match between the two different calculations is achieved, the sensor is deemed to be authenticated and is then permitted to commence normal operation. If the authentication attempt fails, sensor module 106A may not be allowed to operate. For example, power may be removed from the sensor module 106A.

Sensor processing unit 102, e.g., sensor application 116, may then provide a request for a report descriptor to sensor module 106A. Table 3 is one example byte frame format for a report request descriptor.

TABLE 3

| Byte | Field | Value |
|---|---|---|
| 1 | Request Length | 0x02 |
| 2 | Report Descriptor Usage ID (e.g., 0xFA) | 0xFA |
| 3 | CRC Byte (XOR of all the above Bytes) | 0xF8 |

As illustrated in Table 3, the byte frame format for a report descriptor request frame may include three fields with each field having a length of one byte. The first field is configured to contain a length of the report descriptor request. The second field is configured to contain the report descriptor usage identifier, e.g., 0xFA, and the third field is configured to contain the CRC byte for the report descriptor request.

Sensor module 106A may then be configured to provide a report descriptor (i.e., HID report descriptor) in response to the request for the report descriptor. Table 4 illustrates a report descriptor byte frame format.

TABLE 4

| Byte | Field | Value |
|---|---|---|
| 1 to 2 | Report Descriptor Length | 0x00XX |
| 3 to n | Report Descriptor Information | variable |
| N + 1 | CRC Byte (XOR of all the above Bytes) | 0xYY |

The HID report descriptor includes three fields and may include a plurality of bytes. For example, the first field has a length of two bytes and is configured to contain the report descriptor length. The second field is configured to contain the report descriptor information and is of variable length. The last field has length of one byte and is configured to contain the CRC byte. The report descriptor information is sensor-specific. In other words, the information included in the report descriptor information field and the associated values are related to the sensor and associated sensor characteristics. For example, the report descriptor information may vary with one or more of sensor name, sensor manufacturer, sensor serial number, sensor module hardware version and/or sensor module firmware version. The report descriptor information may include sensor metadata, e.g., report size, report count, minimum sensor value, maximum sensor value, minimum reporting interval, sensor manufacturer, sensor model, sensor serial number, sensor description, sensor unique ID, human-readable sensor name, etc. The CRC checksum byte is configured to indicate that a correct frame has been received.

Once the report descriptor has been provided, the enumeration phase may be complete. The sensor module 106A may then be configured to determine the associated sensor 122 state and to communicate, i.e. report, the sensor state to the sensor processing unit 102.

Table 5 illustrates one example report byte frame format and byte fields for a lifecycle report descriptor. The lifecycle report descriptor may include one or more report(s). For example, a sensor hub device that includes, e.g., four different sensors in a single package, may produce four reports with one report for each of the sensors.

TABLE 5

| Byte | Bit | | | | | | | |
|---|---|---|---|---|---|---|---|---|
| | 7 | 6 | 5 | 4 | 3 | 2 | 1 | 0 |
| 1 | Number of Reports | | | Operation Type | | Report Type | | |
| 2 | Length | | | | | | | |
| 3 | Report ID (Specific to each sensor) | | | | | | | |
| 4 to 5 | Sensor State Usage ID (common to all sensors) | | | | | | | |
| 6 to 7 | Actual Sensor State | | | | | | | |

The lifecycle report descriptor includes both byte length fields and bit length fields. For example, the lifecycle report descriptor may include seven bytes and seven fields. The first byte includes three fields and includes two bits corresponding to report type, two bits corresponding to operation type and three bits corresponding to the number of reports. The fourth field that has length one byte is configured to contain report descriptor length. The fifth field that has length one byte is configured to contain a report identifier that is specific to each sensor. The sixth field includes bytes four and five and contain a sensor state usage identifier that may be common to a plurality of sensors. The sensor state usage identifier is configured to denote a sensor state report. The seventh field includes bytes six and seven and contains an actual sensor state.

Table 6 illustrates example report identifiers associated with each sensor. The report identifiers may be contained in the fifth field, third byte of the report descriptor illustrated in Table 5. The report identifiers are two digit hexadecimal numbers and each hexadecimal number corresponds to a sensor type. Some sensor types, e.g., CO2, may have more than one corresponding report ID. Thus, up to 255 sensors may be identified, i.e., 0x00 is typically not used as a report identifier (ID).

TABLE 6

| Sensor | Report ID |
|---|---|
| CO | 0x11 |
| SO2 | 0x14 |
| NO2 | 0x17 |
| NOx | 0x1A |
| CO2 | 0x01, 0x02, 0x03 |
| NO2 | 0x04, 0x05, 0x06 |
| PM2.5 | 0x2A, 0x2B, 0x2C |
| PM10 | 0x2D, 0x2E, 0x2F |
| Temp | 0x3A |
| Humidity | 0x3D |
| Sound | 0x41 |
| Light | 0x47 |
| ETO | 0x21 |

Thus, each sensor is configured to have an associated report identifier. The sensor state definition usage identifier may contain the value 0x0201 that is constant for all sensors indicating that the report is a sensor state report.

Table 7 illustrates example sensor states associated with each sensor and/or sensor module, e.g., sensor 122 and/or sensor module 106A. Sensor state indicators may be included in the seventh field, sixth and seventh bytes of the report descriptor illustrated in Table 5. The sensor state indicators are four digit hexadecimal numbers and each hexadecimal number corresponds to a respective sensor state.

TABLE 7

| Sensor State | Value |
|---|---|
| Sensor State: Undefined/Unknown | 0x0800 |
| Sensor State: Ready | 0x0801 |
| Sensor State: Not Available | 0x0802 |
| Sensor State: No Data | 0x0803 |
| Sensor State: Initializing | 0x0804 |
| Sensor State: Access Denied | 0x0805 |
| Sensor State: Error | 0x0806 |

The sensor states include, but are not limited to, undefined (and/or unknown), ready (i.e., ready to present data to an application), not available (i.e., is not ready to present data to the application), no data (i.e., no data available to be presented to the application), initializing (i.e., sensor is warming up following a power-on) and access denied (i.e., sensor is preventing access to the measurement data). Ready corresponds to a sensor and/or sensor module that are ready to present measurement data and/or sensor data to an application.

Upon completion of the initial enumeration, the sensor module 106a may be configured to communicate (i.e., report) the sensor state to the sensor processing unit 102. If the sensor state corresponds to error, the sensor module 106A may report (i.e. communicate) an error report to sensor processing unit 102 and sensor application 116.

If the sensor state corresponds to ready, the sensor module 106A may then be configured to report (i.e., communicate) the sensor data. The sensor data may be communicated to the sensor processing unit 102. For example, the sensor module 106A may be configured to communicate the sensor data at predefined and/or possibly preconfigured report intervals. In another example, sensor module 106A may be configured to provide sensor data whenever the sensor data is available. In other words, in this example, durations of time intervals between reports may vary.

Table 8 illustrates one example of a sensor data report byte frame format. The sensor data report byte frame format illustrated in Table 8 is similar to the report byte frame format and byte fields for a lifecycle report descriptor illustrated in Table 5 with the exception of fields six (i.e., bytes 4 to 5) and seven (i.e., bytes 6 to 10).

TABLE 8

| | Bit | | | | | | | |
|---|---|---|---|---|---|---|---|---|
| Byte | 7 | 6 | 5 | 4 | 3 | 2 | 1 | 0 |
| 1 | Number of Reports | | | | Operation Type | | Report Type | |
| 2 | Length | | | | | | | |
| 3 | Report ID (Specific to each sensor) | | | | | | | |
| 4 to 5 | Data field usage ID (Specific to each sensor) | | | | | | | |
| 6 to 10 | Sensor data in IEEE 754 single precision binary floating-point format | | | | | | | |

Field six of the sensor state report byte frame format illustrated in Table 5 is configured to contain a sensor state usage identifier common to all sensors. Field six of the sensor data report byte frame format illustrated in Table 8 is configured to contain a data field usage identifier specific to each sensor. Field seven of the sensor state report byte frame format illustrated in Table 5 is configured to contain a sensor state indicator and field seven of the sensor data report byte frame format illustrated in Table 8 is configured to contain four bytes of sensor data in IEEE 754 single-precision binary floating-point format.

Table 9 illustrates data field usage identifiers for a range of sensors. In particular, sensor data field usage identifiers may be included in the fourth and fifth bytes and sensor data may be included in bytes 6 through 9 of an HID report frame.

TABLE 9

| Byte | Field | Value |
|---|---|---|
| 1 | Number of Reports, Operation Type & Report Type | 0x19 |
| 2 | Length | 0x08 |
| 3 | Report ID (The following values will be observed depending on type of sensor) | 0x11 or 0x12 or 0x13 |
| | CO Sensor     0x11 | |
| | SO2 Sensor    0x14 | |
| | NO2 Sensor    0x17 | |
| | NOx Sensor    0x1A | |
| | CO2 Sensor    0x01-0x03 | |
| | N02 Sensor    0x04-0x06 | |
| | PM2.5 Sensor  0x2A-0x2C | |
| | PM10 Sensor   0x2D-0x2F | |
| | Temp Sensor   0x3A | |
| | Humidity Sensor  0x3D | |
| | Sound Sensor  0x41 | |
| | Light Sensor  0x47 | |
| | ETO           0x21 | |
| 4 & 5 | Sensor Data Field Usage ID (Specific sensors) | 0xF301 |
| | CO Sensor     0xF301 | |
| | SO2 Sensor    0xF306 | |
| | NO2 Sensor    0xF311 | |
| | NO Sensor     0xF316 | |
| | PM2.5 Sensor  0xF501 | |
| | PM10 Sensor   0xF506 | |
| | Temp Sensor   0x0434 | |
| | Humidity Sensor  0x0433 | |
| | Sound Sensor  0x0437 | |
| | Light Sensor  0x04D1 | |
| | ETO           0xF321 | |
| 6-9 | Measured sensor data | 0xYYYYYYYY |
| 10 | CRC Byte (XOR of all the above Bytes) | 0xXX |

The sensor module 106A may be further configured to communicate (i.e., report) a change in sensor state to sensor processing unit 102. Reporting a change in sensor state is configured to facilitate lifecycle management operations of sensor processing unit 102. For example, sensor processing unit 102 may be configured to power cycle a sensor module, e.g., sensor module 106A, if a provided sensor state corresponds to an error.

Table 10 illustrates operation type specifiers. The operation type corresponds to the second field, i.e., Operation Type, included in the sensor state byte frame format of Table 5 and sensor data report frame of Table 8. A Set operation corresponds to a sensor processing unit to sensor module transaction. A Get operation corresponds to a sensor module, e.g., sensor module 106A, to sensor processing unit, e.g., sensor processing unit 102, transaction. Data from a sensor module to a sensor processing unit and associated application (e.g., sensor processing unit 102 and sensor application 116) is a GET request and data from the application to a sensor module is a SET request.

TABLE 10

| Operation Type | |
|---|---|
| Value | Operation |
| 00 | Reserved |
| 01 | Set Request |
| 10 | Get Request |
| 11 | Reserved |

Table 11 illustrates an example of a GET request byte frame format. The number of reports, e.g., one, operation type, e.g., GET, and report type, e.g., input report, are combined using a logical OR operation to form the first byte of the GET request frame.

A SET request frame uses the same byte frame format. The number of reports, e.g. one, operation type, e.g., SET, and report type, e.g., output report, may be combined using a logical OR operation to form the first byte of the SET request frame.

TABLE 11

| Byte | Bit | | | | | | | |
|---|---|---|---|---|---|---|---|---|
| | 7 | 6 | 5 | 4 | 3 | 2 | 1 | 0 |
| 1 | Number of Reports | | | | Operation Type | | Report Type | |
| 2 | Length | | | | | | | |
| 3 | Report ID (Specific to each sensor) | | | | | | | |
| 4 | Sensor Property usage ID (Specific to each sensor property) | | | | | | | |

Table 12 illustrates report type specifiers. The report type corresponds to the first field, i.e., report type, included in the sensor state and sensor data report byte frame formats. An input report type corresponds to a report that includes sensor data and/or sensor status, including an error state. A feature report type corresponds to a get request or a set request related to one or more properties of sensor module 106A and or sensor 122. An example of a property may include a sensor reporting interval, i.e., the time interval between sensor measurements. An example of a property change operation may include reducing the time interval between reports from one minute to thirty seconds via a SET request. An output report type corresponds to a report utilized by the sensor processing unit 102, e.g., sensor application 116, for actuation purposes. For example, actuation may include switching an external control entity on or off, adjusting a valve setting, etc.

TABLE 12

| Report Type | |
|---|---|
| Value | Report Type |
| 00 | Not Used |
| 01 | Input Report |
| 10 | Output Report |
| 11 | Feature Report |

In some embodiments, support for other sensor and/or actuator functionality may be provided. For example, the operation type bytes may be utilized to support other sensor and/or actuator functionality including, but not limited to, switching external power supplies, adjusting the orientation of a movable sensor, e.g. adjust the azimuth and/or elevation of a sensor.

Thus, an apparatus, method and/or system are configured to manage a respective lifecycle of each of a plurality of sensors. Each sensor module is configured to provide enumeration data, e.g., at power up, and lifecycle data during its respective lifecycle. A sensor module, consistent with the present disclosure, includes a sensor controller and a sensor. The sensor controller is configured to enumerate the sensor module and/or the sensor to a sensor processing unit. The sensor controller is further configured to monitor operation of the sensor and to provide sensor lifecycle information to the sensor processing unit over the lifecycle of the sensor. The sensor is configured to capture measurement data corresponding to a value of an environmental parameter and to provide an electrical signal as output (i.e., sensor data) that is related to the measurement data. The sensor controller is configured to receive the sensor data and to report associated sensor data to the sensor processing unit. The sensor processing unit may then be configured to manage the lifecycle of each associated sensor.

Figure 2:
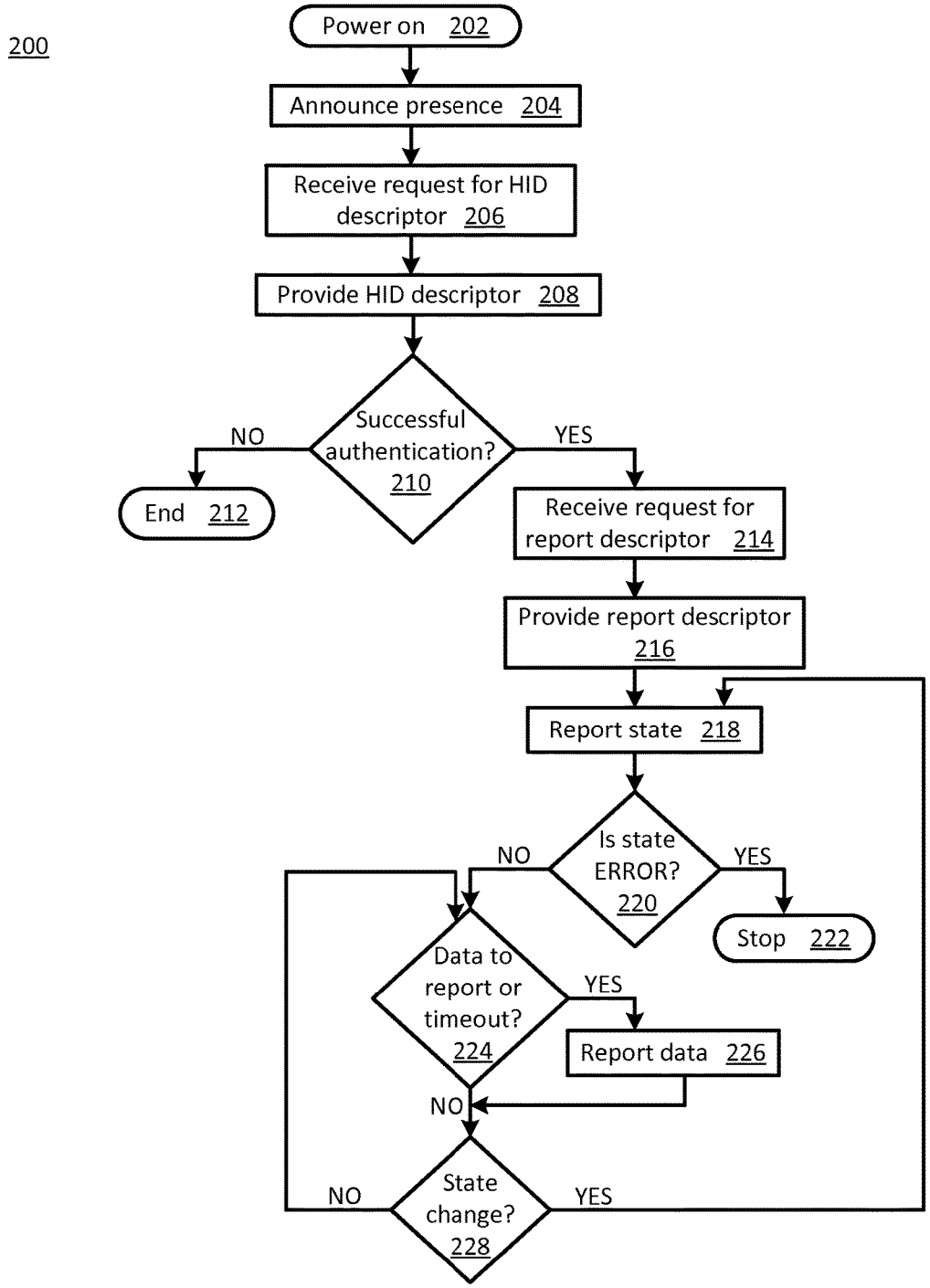
FIG. 2 is a flowchart of example sensor lifecycle management operations according to various embodiments of the present disclosure.

FIG. 2 is a flowchart 200 of lifecycle management operations according to various embodiments of the present disclosure. In particular, the flowchart 200 illustrates discovery, enumeration, status monitoring and reporting and data reporting for a sensor, e.g., sensor 122 of sensor module 106A. The operations may be performed, for example, by sensor modules 106A, 106B, . . . , and/or 106n of FIG. 1.

Operations of this embodiment may begin with operation 202 power on. For example, a sensor module, e.g., sensor module 106A, may be powered on. A presence of a sensor module may be announced at operation 204. For example, announcing may include asserting an interrupt. A request for an HID descriptor may be received at operation 206. Operation 208 may include providing an HID descriptor. For example, the request for the HID descriptor may be received from, and the HID descriptor may be provided to, a sensor processing unit, e.g., sensor processing unit 102. Whether an authentication was successful may be determined at operation 210. If the authentication was not successful, program flow may end at operation 212. If the authentication was successful, a request for a report descriptor may be received at operation 214. The report descriptor may then be provided at operation 216.

A state may be reported at operation 218. For example, a sensor state may be reported to a sensor processing unit, facilitating lifecycle management. Whether the state corresponds to an error may be determined at operation 220. If the state corresponds to an error, program flow may stop at operation 222. If the state does not correspond to an error, whether there is data to report or a timeout has occurred may be determined at operation 224. For example, the timeout may correspond to a sensor module that is configured to report at predefined intervals. If there is data to report or a timeout has occurred, data may be reported at operation 226. Whether the state has changed may be determined at operation 228. If the state has changed, program flow may proceed to operation 218, report state. If the state has not changed, program flow may proceed to operation 224. If there is no data to report or no timeout has occurred at operation 224, program flow may proceed to operation 228.

Thus, a sensor module may be discovered and enumerated in response to being powered on. The sensor status may be monitored and communicated to a sensor processing unit. Thus, lifecycle information may be provided to the sensor processing unit during the lifecycle of the sensor.

Figure 3:
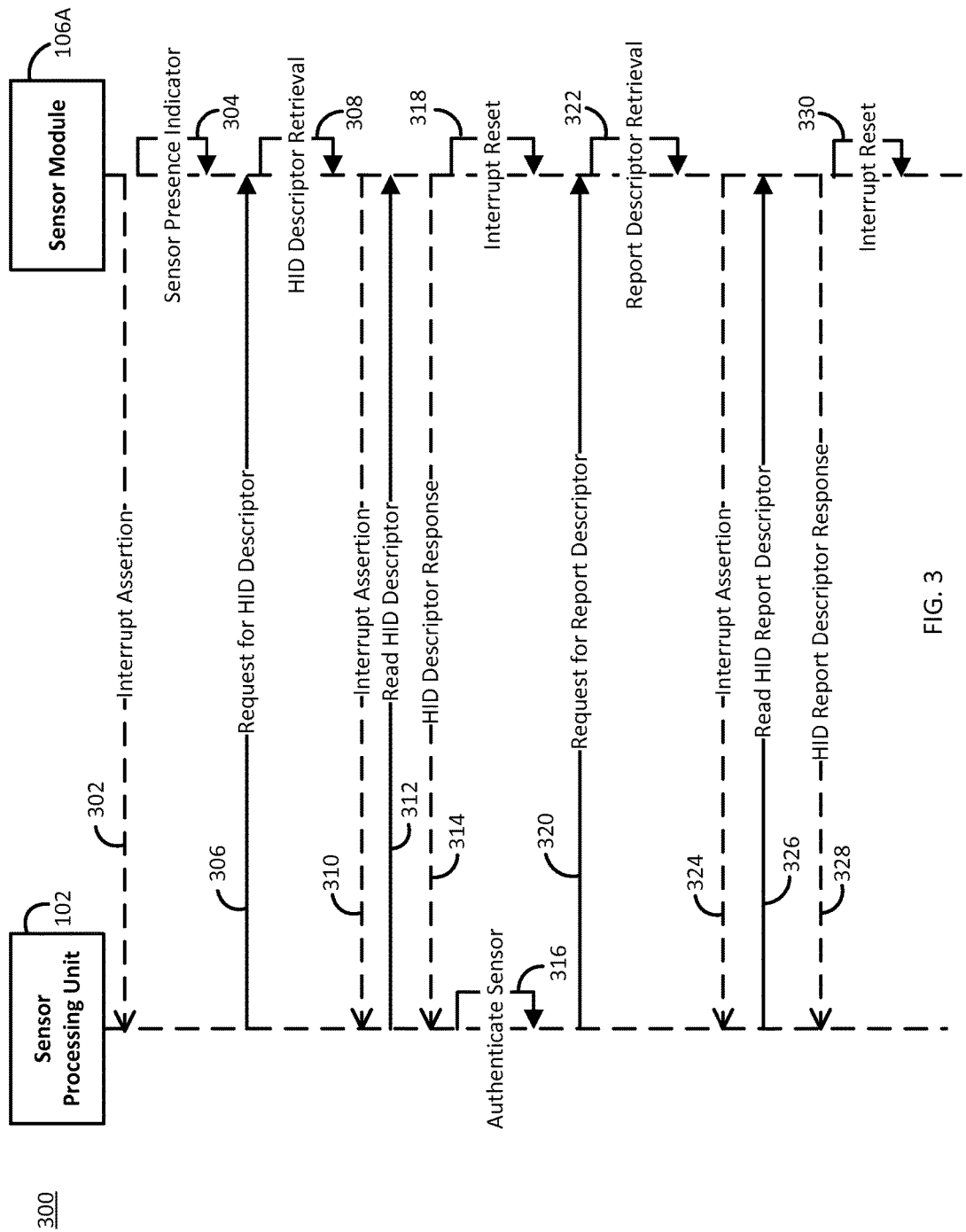
FIG. 3 illustrates a sequence of example sensor lifecycle management operations consistent with several embodiments of the present disclosure.

FIG. 3 illustrates one example 300 of communication between a sensor module, e.g., sensor module 106A, and a sensor processing unit, e.g., sensor processing unit 102. The communication and/or operations illustrated in example 300 may be initiated in response to a powering on of sensor module 106A. The communication and/or operations illustrated in example 300 correspond to an initial interrupt assertion, e.g., in response to a power on of a sensor module, through an interrupt reset following provision of an HID report descriptor response. Example 300 may thus correspond to an enumeration phase, as described herein.

Operations of this embodiment may begin with an interrupt assertion at operation 302. A sensor presence indicator may be provided at operation 304. For example, sensor module 106A may be configured to provide an indicator that a sensor has been connected to a sensor slot and is available for use by an application, e.g., sensor application 116. For example, the indicator of a present sensor may be that the sensor responds to READ and/or WRITE I2C commands communicated via the sensor application. A request for an HID descriptor may be communicated at operation 306. The HID descriptor may be retrieved by the sensor module 106A at operation 308. An interrupt related to the HID descriptor may be asserted at operation 310. The HID descriptor may be read at operation 312. The HID descriptor response may be provided at operation 314. The interrupt may be reset at operation 318. For example, the sensor module 106A may be configured to reset the interrupt. The sensor may be authenticated at operation 316. For example, sensor processing unit 102 may be configured to authenticate the sensor, as described herein. A request for a report descriptor may be communicated at operation 320. The report descriptor may be retrieved at operation 322. For example, the report descriptor may be retrieved by sensor logic 136 from a data store 138 included in sensor module 106A. An interrupt related to the report descriptor may be asserted at operation 324. The HID report descriptor may be read at operation 326. The HID report descriptor response may be provided at operation 328. The report descriptor interrupt may be reset at operation 330.

Thus, a sensor module, e.g., sensor module 106A, may be discovered and enumerated in response to powering on. The sensor module 106A may be configured to assert an interrupt when there is information (e.g., an HID descriptor, a report descriptor) to be communicated. A sensor processing unit, e.g., sensor processing unit 102, may be configured to service the interrupt by requesting a selected descriptor. The request for a descriptor initiates the sensor module to prepare a descriptor. Following the request for a descriptor, the sensor processing unit may then read the selected descriptor.

Figure 4:
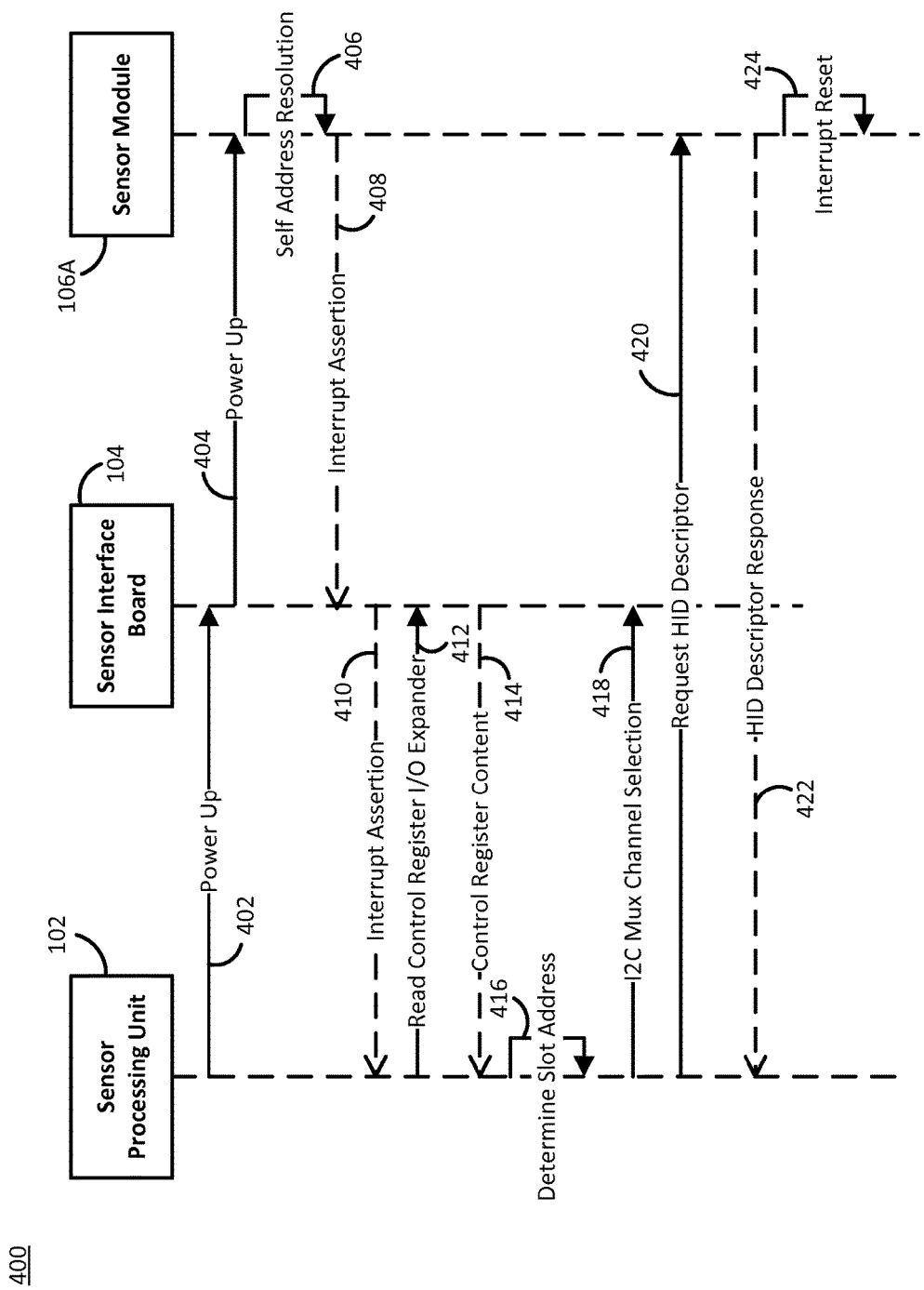
FIG. 4 illustrates a sequence of example sensor enumeration operations according to various embodiments of the present disclosure.

FIG. 4 illustrates one example 400 of communication between a sensor module, e.g., sensor module 106A, a sensor interface board, e.g., sensor interface board 104, and a sensor processing unit, e.g., sensor processing unit 102. The communication and/or operations illustrated in example 400 correspond to an initial powering up, an initial interrupt assertion (e.g., in response to the powering on of a sensor module), an address determination and associated MUX channel selection and an interrupt reset following provision of an HID descriptor response. Example 400 may thus correspond to a portion of an enumeration phase, as described herein.

Operations of this embodiment may begin with a power up command and/or operation 402 from a sensor processing unit, e.g., sensor processing unit 102, to a sensor interface, e.g., sensor interface board 104. The power may then be provided from the sensor interface board 104 to the sensor module 106A at operation 404. A self address resolution may be performed at operation 406. For example, the self address resolution may be performed by sensor module 106A. The self address resolution may include detecting (i.e., determining) the sensor slot address that the sensor is connected to followed by an interrupt that may be asserted at operation 408. For example, the interrupt assertion may be provided by the sensor module 106A to the sensor interface board 104. The interrupt assertion may then be provided from the sensor interface board 104 to the sensor processing unit 102 at operation 410. A control register input/output (I/O) expander may be read at operation 412. For example, the control register I/O expander may be read by the sensor processing unit 102. Control register content may be provided at operation 414. A slot address may be determined at operation 416. An I2C MUX channel may be selected at operation 418. Operations 412, 414 and 418 occur between the sensor processing unit 102 and the sensor interface board 104. Operation 416 may be performed by the sensor processing unit 102. Operations 412, 414, 416 and 418 are configured to determine an address associated with a selected sensor module, e.g., sensor module 106A and to control a MUX, e.g., MUX 144, to select an output that corresponds to the selected sensor module address.

A request for an HID descriptor may then be provided by sensor processing unit 102 to sensor module 106A at operation 420. The HID descriptor, i.e., HID descriptor response, may then be provided to the sensor processing unit 102 by sensor module 106A at operation 422. The interrupt may then be reset by the sensor module 106A at operation 424.

Thus, in response to powering up a sensor module, an associated address, i.e., slot address, may be determined, a corresponding MUX channel may be selected and an HID descriptor may be requested and received.

Figure 5:
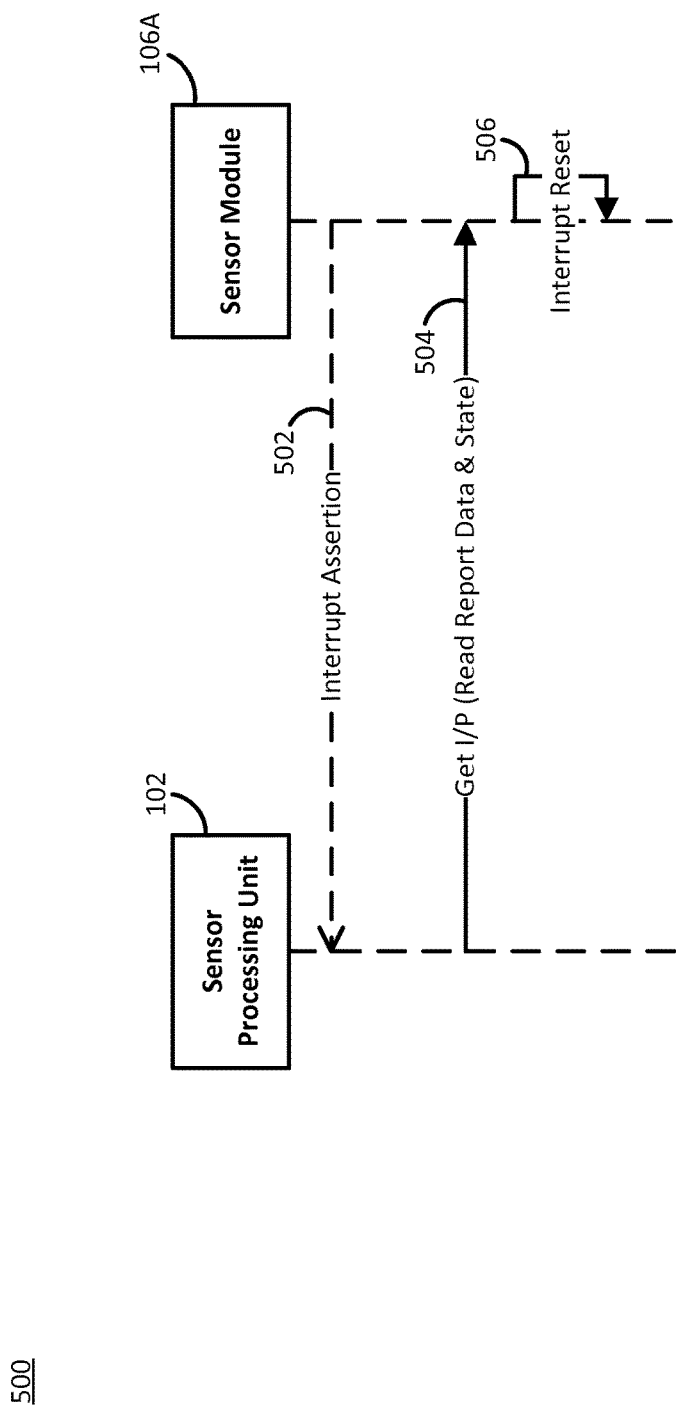
FIG. 5 illustrates a sequence of example sensor report operations according to various embodiments of the present disclosure.

FIG. 5 illustrates one example 500 of communication between a sensor module, e.g., sensor module 106A, and a sensor processing unit, e.g., sensor processing unit 102. The communication and/or operations illustrated in example 500 correspond to an interrupt assertion, e.g., in response to a change in sensor state, through an interrupt reset following a request for a report descriptor. Example 500 may thus correspond to an operation associated with a lifecycle phase, as described herein.

Operations of this embodiment may begin with an interrupt assertion at operation 502. A report may be requested at operation 504. Thus, operation 504 is a report read request. I/P corresponds to 'Input'. A read request is issued first and then the byte values returned represent the results of that read operation, i.e., the report. Further, a GET corresponds to a read request, e.g., a report request and a SET corresponds to a write request, e.g., sensor configuration change. The interrupt may be reset at operation 506.

Figure 6:
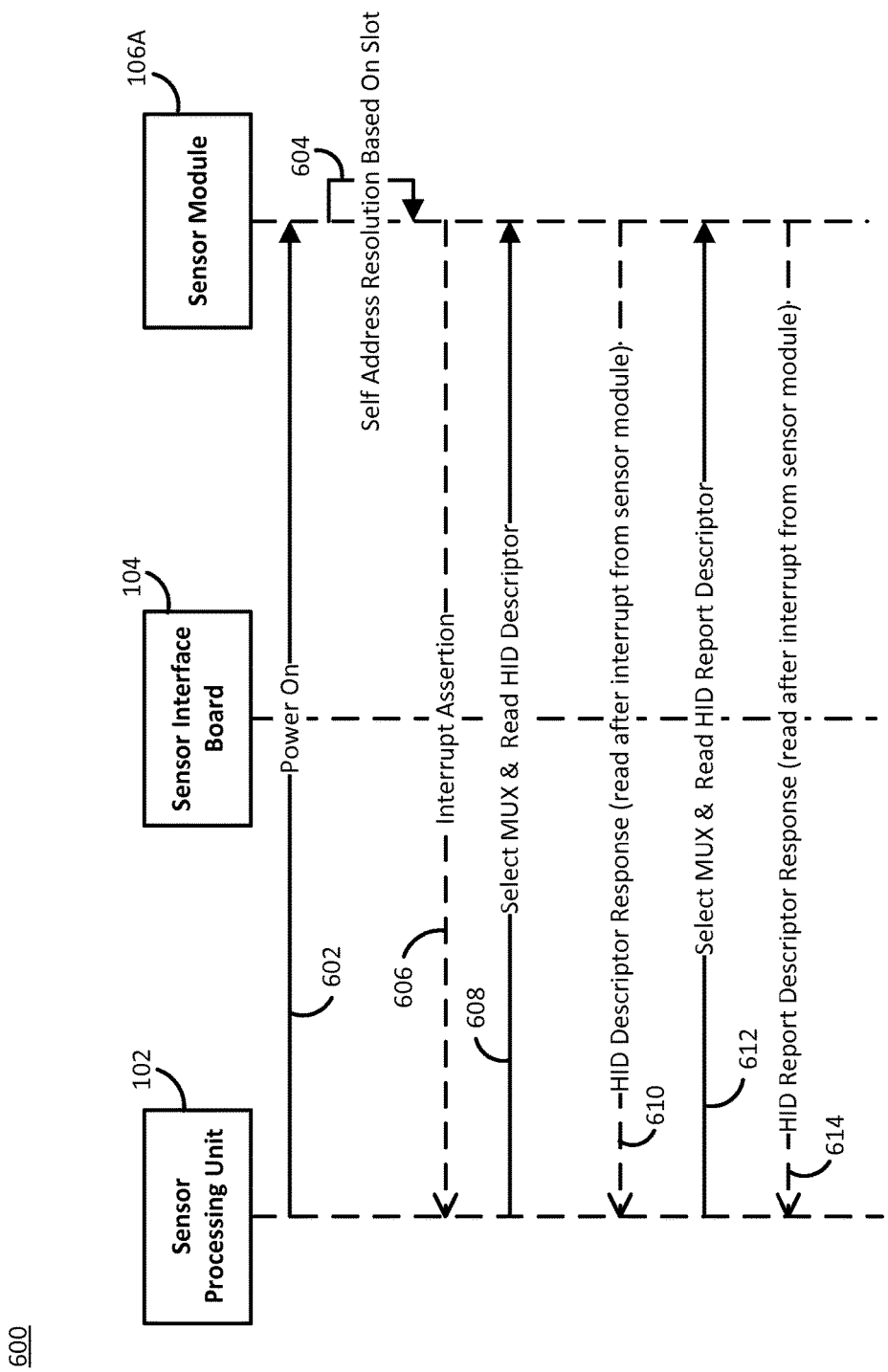
FIG. 6 illustrates a sequence of example sensor report operations according to one embodiment of the present disclosure.

FIG. 6 illustrates one example 600 of communication between a sensor module, e.g., sensor module 106A, a sensor interface board, e.g., sensor interface board 104, and a sensor processing unit, e.g., sensor processing unit 102. The communication and/or operations illustrated in example 600 correspond to an initial powering up, an initial interrupt assertion, e.g., in response to the powering on of a sensor module, a MUX channel selection through an HID descriptor response. Example 400 may thus correspond to a portion of an enumeration phase, as described herein.

Operations of this embodiment may begin with a powering on at operation 602. For example, the power on indication may be provided from a sensor processing unit. A self address resolution based on slot may be performed at operation 604. For example, a sensor module may be configured to determine its address based on a slot in the sensor interface board. In other words, the sensor module may be coupled to the sensor interface board at a slot and operation 604 corresponds to the sensor module determining the address of the slot.

An interrupt may be asserted at operation 606. For example, the sensor module may be configured to assert an interrupt via an interrupt line associated with the corresponding slot. A MUX channel may be selected and a request to read an HID descriptor provided at operation 608. An HID descriptor response may be read at operation 610. The HID descriptor response may be read following an interrupt assertion from the sensor module. Operation 612 includes selecting a MUX channel and requesting to read an HID report descriptor. An HID report descriptor response may be read at operation 614. The HID report descriptor response may be read following an interrupt assertion from the sensor module.

Thus, in response to powering up a sensor module, an associated address, i.e., slot address, may be determined, a corresponding MUX channel may be selected, an HID descriptor may be requested and received and an HID report descriptor may be requested and received.

While the flowchart and examples of FIGS. 2 through 6 illustrate operations according various embodiments, it is to be understood that not all of the operations depicted in FIGS. 2 through 6 are necessary for other embodiments. In addition, it is fully contemplated herein that in other embodiments of the present disclosure, the operations depicted in FIGS. 2, 3, 4, 5 and/or 6 and/or other operations described herein may be combined in a manner not specifically shown in any of the drawings, and such embodiments may include less or more operations than are illustrated in FIGS. 2 through 6. Thus, claims directed to features and/or operations that are not exactly shown in one drawing are deemed within the scope and content of the present disclosure.

Referring again to FIG. 1, a sensor lifecycle management system, e.g., sensor lifecycle management system 101, may be configured to provide sensor lifecycle management information to a host system, e.g., host system 108, for display to a user via UI 142. The sensor lifecycle management information may include, for example, discovery results, enumeration information as well as sensor type and/or manufacturer information. For example, Table 13 illustrates example log result excerpts from a sensor discovery stage. In this example, a total of 10 sensor modules (and associated sensors) were discovered. In the table SM, corresponds to sensor module.

TABLE 13

Jun 12 10:41:06 984fee016f24 ar-SPU: I2C device was opened
Jun 12 10:41:26 984fee016f24 ar-SPU: Write 0 to enable power to all SM
Jun 12 10:41:36 984fee016f24 ar-SPU: Device initialised
Jun 12 10:41:36 984fee016f24 ar-SPU: I2CInit: PASS
Jun 12 10:41:36 984fee016f24 ar-SPU: Called getSensorInterrupts
Jun 12 10:41:36 984fee016f24 ar-SPU: Interrupt resolved to be caused by 'Sensor Slot 0'/J1/I2C address 38
Jun 12 10:41:36 984fee016f24 ar-SPU: Interrupt resolved to be caused by 'Sensor Slot 1'/J2/I2C address 31
Jun 12 10:41:36 984fee016f24 ar-SPU: Interrupt resolved to be caused by 'Sensor Slot 2'/J3/I2C address 32
Jun 12 10:41:36 984fee016f24 ar-SPU: Interrupt resolved to be caused by 'Sensor Slot 3'/J4/I2C address 33
Jun 12 10:41:36 984fee016f24 ar-SPU: Interrupt resolved to be caused by 'Sensor Slot 4'/J5/I2C address 34
Jun 12 10:41:36 984fee016f24 ar-SPU: Interrupt resolved to be caused by 'Sensor Slot 5'/J6/I2C address 30
Jun 12 10:41:36 984fee016f24 ar-SPU: Looped through all the possible Sensor Module interrupt registers
Jun 12 10:41:36 984fee016f24 ar-SPU: Count is 10

Continuing with this example, following detection of the sensors, sensor identification operations are performed to determine a sensor type for each sensor module discovered. Table 14 illustrates sensor type determination results for one sensor of the 10 sensors discovered and illustrated in Table 13. Table 14 further illustrates a successful authentication operation.

TABLE 14

Jun 12 10:41:37 984fee016f24 ar-SPU: Now making a HID request
Jun 12 10:41:37 984fee016f24 ar-SPU: Expecting to receive a HID response of length: 57 bytes
Jun 12 10:41:37 984fee016f24 ar-SPU: Auth seed byte 0: f1
Jun 12 10:41:37 984fee016f24 ar-SPU: Auth seed byte 1: 34
Jun 12 10:41:37 984fee016f24 ar-SPU: Serial byte 0: 35
Jun 12 10:41:37 984fee016f24 ar-SPU: Serial byte 1: 36
Jun 12 10:41:37 984fee016f24 ar-SPU: Auth response byte 0: c4
Jun 12 10:41:37 984fee016f24 ar-SPU: Auth response byte 1: 2
Jun 12 10:41:37 984fee016f24 ar-SPU: Using the XOR authentication method
Jun 12 10:41:37 984fee016f24 ar-SPU: Sensor was authenticated
Jun 12 10:41:37 984fee016f24 ar-SPU: Authentication key: 19
Jun 12 10:41:37 984fee016f24 ar-SPU: HID protocol version: 1
Jun 12 10:41:37 984fee016f24 ar-SPU: Iterating through 1 sensor descriptors
Jun 12 10:41:37 984fee016f24 ar-SPU: HID descriptor length: 1a
Jun 12 10:41:37 984fee016f24 ar-SPU: Sensor type: PM2P5
Jun 12 10:41:37 984fee016f24 ar-SPU: Sensor tag: SENS_PM2P5
Jun 12 10:41:37 984fee016f24 ar-SPU: Sensor name: PM2P5
Jun 12 10:41:37 984fee016f24 ar-SPU: Sensor sym: PM2PT5
Jun 12 10:41:37 984fee016f24 ar-SPU: Sensor report ID[0]: 2a

TABLE 14-continued

Jun 12 10:41:37 984fee016f24 ar-SPU: Sensor report ID[1]: 2c
Jun 12 10:41:37 984fee016f24 ar-SPU: Manufacturer name: ACME
Jun 12 10:41:37 984fee016f24 ar-SPU: Serial number: 123456

Continuing with this example, after the sensor modules have been detected and authenticated, a summary of the suite available sensors may be provided to the user via the UI 142. Table 15 illustrates an example of the sensor suite summary information provided to the user via host system 108 and UI 142. In this example, the sensor suite includes 10 different sensors

TABLE 15

Jun 12 10:42:08 984fee016f24 ar-SPU: ENUMERATION COMPLETE:
10 sensors have been enumerated
Jun 12 10:42:08 984fee016f24 ar-SPU: PM2P5
Jun 12 10:42:08 984fee016f24 ar-SPU: PM10
Jun 12 10:42:08 984fee016f24 ar-SPU: Nitrogen Dioxide
Jun 12 10:42:09 984fee016f24 ar-SPU: Carbon Monoxide
Jun 12 10:42:09 984fee016f24 ar-SPU: Sulphur Dioxide
Jun 12 10:42:09 984fee016f24 ar-SPU: Nitric Oxide
Jun 12 10:42:09 984fee016f24 ar-SPU: Temperature
Jun 12 10:42:09 984fee016f24 ar-SPU: Relative Humidity
Jun 12 10:42:09 984fee016f24 ar-SPU: Light
Jun 12 10:42:09 984fee016f24 ar-SPU: Sound Continuing with this example, for a normal operational sensor, program flow may proceed to an observation and reporting phase. The observation and reporting phase corresponds to the lifecycle phase, as described herein. Table 16 illustrates excerpted log information that may be provided during the reporting phase for a fine particulate matter sensor for particle size 2.5 µm (micrometers) or less. The last row in Table 16 includes a reported sensor value which is measured in units of parts per million (ppm). It may be appreciated that the sensor observation data are represented in four-byte IEEE 754 format (binary floating point format) and converted to an ASCII representation of a corresponding decimal value prior to dispatch to the sensor application, e.g., sensor application 116, for display via UI 142.

TABLE 16

Jun 12 10:43:37 984fee016f24 ar-SPU: The received report was for PM2P5
Jun 12 10:43:37 984fee016f24 ar-SPU: reportResponseFrame->_requestType: 29
Jun 12 10:43:37 984fee016f24 ar-SPU: reportResponseFrame->_length: 08
Jun 12 10:43:37 984fee016f24 ar-SPU: reportResponseFrame->_reportID: 2a
Jun 12 10:43:37 984fee016f24 ar-SPU: reportResponseFrame->_usageID[0]: f5
Jun 12 10:43:37 984fee016f24 ar-SPU: reportResponseFrame->_usageID[1]: 01
Jun 12 10:43:37 984fee016f24 ar-SPU: sensor byte[0]: 06
Jun 12 10:43:37 984fee016f24 ar-SPU: sensor byte[1]: 58
Jun 12 10:43:37 984fee016f24 ar-SPU: sensor byte[2]: 14
Jun 12 10:43:37 984fee016f24 ar-SPU: sensor byte[3]: 3e
Jun 12 10:43:37 984fee016f24 ar-SPU: value: 0.144867

Thus, a sensor lifecycle management system, e.g., sensor lifecycle management system 101, may be configured to provide sensor lifecycle management information to a host system, e.g., host system 108, for display to a user via UI 142. The sensor lifecycle management information may include, for example, discovery results, enumeration information as well as sensor type and/or manufacturer information.

Thus, an apparatus, method and/or system are configured to manage a respective lifecycle of each of a plurality of sensors. Each sensor module is configured to provide enumeration data, e.g., at power up, and lifecycle data during its respective lifecycle. A sensor module, consistent with the present disclosure, includes a sensor controller and a sensor. The sensor controller is configured to enumerate the sensor module and/or the sensor to a sensor processing unit. The sensor controller is further configured to monitor operation of the sensor and to provide sensor lifecycle information to the sensor processing unit over the lifecycle of the sensor. The sensor is configured to capture measurement data corresponding to a value of an environmental parameter and to provide an electrical signal as output (i.e., sensor data) that is related to the measurement data. The sensor controller is configured to receive the sensor data and to report associated sensor data to the sensor processing unit. The sensor processing unit may then be configured to manage the lifecycle of each associated sensor. Thus, inappropriate action based on erroneous sensor data may be avoided.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as computer processors comprising one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

The foregoing provides example system architectures and methodologies, however, modifications to the present disclosure are possible. The processor may include one or more processor cores and may be configured to execute system software. System software may include, for example, an operating system. Device memory may include I/O memory buffers configured to store one or more data packets that are to be transmitted by, or received by, a network interface. The operating system (OS) may be configured to manage system resources and control tasks that are run on, e.g., host system 108. For example, the OS may be implemented using Microsoft® Windows®, HP-UX®, Linux®, or UNIX®, although other operating systems may be used. In another example, the OS may be implemented using Android™, iOS, Windows Phone® or BlackBerry®.

Communication interfaces 114, 134, communication links 103, 107 and/or host system 108 may comply and/or be compatible with one or more communication specifications, standards and/or protocols.

For example, communication interfaces 114, 134 and/or communication links 103, 107 may comply and/or be compatible with an IPv6 (Internet Protocol version 6) over Low Power Wireless Personal Area Networks (6LoWPAN) standard: RFC (Request for Comments) 6282, titled Compression Format for IPv6 Datagrams over IEEE 802.15.4-Based Networks, published by the Internet Engineering Task Force (IETF), September 2011, and/or later and/or related versions of this standard.

In another example, communication interfaces 114, 134 and/or communication links 103, 107 may comply and/or be compatible with IEEE (Institute of Electrical and Electronics Engineers) 802.15.4-2006 standard titled: IEEE Standard for Information technology—Telecommunications and information exchange between systems—Local and metropolitan area networks—Specific requirements Part 15.4: Wireless Medium Access Control (MAC) and Physical Layer (PHY) Specifications for Low Rate Wireless Personal Area Networks (LR-WPANS), published in 2006 and/or later and/or related versions of this standard.

In another example, communication interfaces 114, 134 and/or communication links 103, 107 may comply and/or be compatible with a ZigBee specification and/or standard, published and/or released by the ZigBee Alliance, Inc., including, but not limited to, ZigBee 3.0, draft released November 2014, ZigBee RF4CE, ZigBee IP, and/or ZigBee PRO published in 2012, and/or later and/or related versions of these standards.

In another example, communication interfaces 114, 134 and/or communication links 103, 107 may comply and/or be compatible with IEEE Std 802.11™-2012 standard titled: IEEE Standard for Information technology—Telecommunications and information exchange between systems—Local and metropolitan area networks—Specific requirements Part 11: Wireless LAN Medium Access Control (MAC) and Physical Layer (PHY) Specifications, published in March 2012 and/or earlier and/or later and/or related versions of this standard, including, for example, IEEE Std 802.11ac™-2013, titled IEEE Standard for Information technology-Telecommunications and information exchange between systems, Local and metropolitan area networks-Specific requirements, Part 11: Wireless LAN Medium Access Control (MAC) and Physical Layer (PHY) Specifications; Amendment 4: Enhancements for Very High Throughput for Operation in Bands below 6 GHz, published by the IEEE, December 2013.

In another example, communication interfaces 114, 134 and/or communication links 103, 107 may comply and/or be compatible with a Wireless Highway Addressable Remote Transducer (HART) specification and/or standard, published and/or released by IEC under IEC 62591 and/or later and/or related versions of these standards.

In another example, communication interfaces 114, 134 and/or communication links 103, 107 may comply and/or be compatible with Long Term Evolution (LTE), Release 8, released March 2011, by the Third Generation Partnership Project (3GPP) and/or later and/or related versions of these standards, specifications and releases, for example, LTE-Advanced, Release 10, released April 2011.

In another example, communication interfaces 114, 134 and/or communication links 103, 107 may comply and/or be compatible with an Extended Coverage GSM (EC-GSM) specification and/or standard, published and/or released by 3GPP and/or later and/or related versions of these standards.

In another example, communication interfaces 114, 134 and/or communication links 103, 107 may comply and/or be compatible with one or more of the Weightless-N open standard, based on a low power wide area (LPWAN) star network architecture, managed by Weightless SIG, Cambridge, United Kingdom; a SIGFOX UNB (Ultra Narrow Band) based radio technology protocol, managed by SIGFOX, Labège France; and/or the LoRaWAN™ network protocol, e.g., LoRaWAN 1.0 Specification, published by the LoRa™Alliance, San Ramon, Calif., and/or later and/or related versions of these standards, protocols and/or specifications.

In another example, communication interfaces 114, 134 and/or communication links 103, 107 may comply and/or be compatible with a Thread specification and/or standard, published and/or released by Google and/or later and/or related versions of these protocols In another example, communication interfaces 114, 134 and/or communication links 103, 107 may comply and/or be compatible with a Bluetooth specification and/or standard, published and/or released by IEEE and/or later and/or related versions of these protocols In another example, communication interfaces 114, 134 and/or communication links 103, 107 may comply and/or be compatible with standard TIA-232 (also and/or formerly known as RS-232), Interface Between Data Terminal Equipment and Data Circuit-Terminating Equipment Employing Serial Binary Data Interchange, Revision F, dated Oct. 1, 1997 and including amendments and changes through Reaffirmation Notice, Dec. 7, 2012, published by Telecommunications Industry Assn. (TIA), and/or later and/or related versions of this standard.

In another example, communication interfaces 114, 134 and/or communication links 103, 107 may comply and/or be compatible with standard TIA-485 (also and/or formerly known as RS-485), Electrical Characteristics of Generators and Receivers for Use in Balanced Digital Multipoint Systems, Revision A, dated Mar. 1, 1998 and including amendments and changes through Reaffirmation Notice, Dec. 7, 2012, published by TIA, and/or later and/or related versions of this standard.

In another example, communication interfaces 114, 134 and/or communication links 103, 107 may comply and/or be compatible with one or more protocol specifications published by the NFC Forum, Wakefield, Mass., including, but not limited to, NFC Logical Link Control Protocol (LLCP) 1.2 Technical Specification, adopted Mar. 20, 2014; NFC Digital Protocol Technical Specification 1.1, adopted Mar. 20, 2014; NFC Activity Technical Specification v1.1, adopted Jan. 23, 2014; NFC Simple NDEF Exchange Protocol (SNEP) Technical Specification, adopted Aug. 31, 2011; NFC Analog Technical Specification 1.1, adopted May 27, 2015; NFC Controller Interface (NCI) Technical Specification v1.1, adopted Jan. 23, 2014, and/or later and/or related versions of these protocol specifications.

In another example, communication interfaces 114, 134 and/or communication links 103, 107 may comply and/or be compatible with a ZWave specification and/or standard, published and/or released by ZWave and/or later and/or related versions of these protocols In another example, communication interfaces 114, 134 and/or communication links 103, 107 may comply and/or be compatible with an ISA100 specification and/or standard, published and/or released by ANSI/ISA, IEC 62734 and/or later and/or related versions of these protocols In another example, communication interface 114 and/or host system 108 may comply and/or be compatible with IEEE Std 802.11™-2012 standard titled: IEEE Standard for Information technology—Telecommunications and information exchange between systems—Local and metropolitan area networks—Specific requirements Part 11: Wireless LAN Medium Access Control (MAC) and Physical Layer (PHY) Specifications, published in March 2012 and/or earlier and/or later and/or related versions of this standard, including, for example, IEEE Std 802.11ac™-2013, titled IEEE Standard for Information technology-Telecommunications and information exchange between systems, Local and metropolitan area networks-Specific requirements, Part 11: Wireless LAN Medium Access Control (MAC) and Physical Layer (PHY) Specifications; Amendment 4—Enhancements for Very High Throughput for Operation in Bands below 6 GHz, published by the IEEE, December 2013.

Communication interface 114, 134 and/or communication links 103, 107 may comply and/or be compatible with one or more serial communication protocol(s).

For example, communication interface 114, 134 and/or communication links 103, 107 may be configured to comply and/or be compatible with one or more serial peripheral interface (SPI) standard(s) and/or protocol(s). SPI is a synchronous serial communication interface typically used for short distance communication.

In another example, communication interface 114, 134 and/or communication links 103, 107 may comply and/or be compatible with I2C-bus specification Version 2.1, published in 2000, and maintained by NXP Semiconductors, Inc., and/or later and/or related versions of this specification, for example, document UM10204, I2C-bus specification and user manual, Rev. 6, published April 2014.

In another example, communication interface 114, 134 and/or communication links 103, 107 may comply and/or be compatible with System Management Bus (SMBus) Specification, Version 2.0, published by the System Management Interface Forum, Inc., August 2000 and/or Version 3.0, published December 2014, and/or later and/or related versions of this specification.

Memory 112, 132 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively memory 204 may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

Thus, operation of one or more sensor arrays may be facilitated. Previously unknown sensors and/or sensor modules may be coupled to a host system and, through enumeration, may be recognized. Further, sensor operation may be monitored throughout the deployment period, i.e., lifecycle information may be acquired, thus avoiding inappropriate action based on erroneous data.

EXAMPLES

Examples of the present disclosure include subject material such as a method, means for performing acts of the method, a device, or of an apparatus or system related to sensor lifecycle management, as discussed below.

Example 1

According to this example, there is provided an apparatus. The apparatus includes a sensor module. The sensor module includes a sensor and a sensor controller. The sensor controller is to enumerate the sensor to a sensor processing unit.

Example 2

This example includes the elements of example 1, wherein the sensor controller is further to report a state of the sensor to the sensor processing unit.

Example 3

This example includes the elements of example 1, wherein the sensor controller is further to report sensor data to the sensor processing unit.

Example 4

This example includes the elements according to any one of examples 1 through 3, wherein the enumerating includes communicating enumeration data to the sensor processing unit, the enumeration data including one or more of a sensor name, a sensor manufacturer name, a sensor serial number, a hardware version, a firmware version, and/or one or more sensor characteristics.

Example 5

This example includes the elements according to any one of examples 1 through 3, wherein the sensor controller is to enumerate the sensor in response to the sensor being powered on.

Example 6

This example includes the elements of example 2, wherein the state is selected from the group including state unknown, ready, not available, no data, initializing, access denied and error.

Example 7

This example includes the elements according to any one of examples 1 through 3, wherein the sensor controller includes a data store to store at least one of enumeration data, lifecycle data and/or sensor data.

Example 8

This example includes the elements according to any one of examples 1 through 3, wherein the sensor controller is further to monitor operation of the sensor and to provide sensor lifecycle information to the sensor processing unit over the lifecycle of the sensor.

Example 9

This example includes the elements according to any one of examples 1 through 3, wherein the sensor is to capture measurement data corresponding to a value of an environmental parameter and to provide sensor data that is related to the measurement data.

Example 10

This example includes the elements of example 9, wherein the sensor controller is to receive the sensor data and to report the sensor data to the sensor processing unit.

Example 11

This example includes the elements according to any one of examples 1 through 3, wherein the sensor controller is to inform the sensor processing unit that it has been connected and what type of sensor it is.

Example 12

This example includes the elements according to any one of examples 1 through 3, wherein the sensor controller is to perform configurable processing on raw sensor observations.

Example 13

This example includes the elements according to any one of examples 1 through 3, wherein the sensor controller is to report lifecycle information including state and error information to a sensor application.

Example 14

This example includes the elements of example 4, wherein the sensor characteristics are selected from the group including information related to a type of sensor reading, whether the sensor requires a warm-up time, a frequency at which a sensor captures data, and/or whether sensor data is to be reported when available or at preset time intervals.

Example 15

This example includes the elements according to any one of examples 1 through 3, wherein the sensor controller is to utilize a communication protocol to enable the sensor controller to communicate at least one of enumeration data, lifecycle data and/or sensor data to the sensor processing unit.

Example 16

This example includes the elements of example 15, wherein the communication protocol complies or is compatible with a USB (Universal Serial Bus) HID (Human Interface Device) protocol.

Example 17

This example includes the elements according to any one of examples 1 through 3, wherein the sensor controller is to utilize a communication protocol to communicate at least one of information and/or data to the sensor processing unit.

Example 18

This example includes the elements of example 17, wherein the information and/or data are organized into one or more frames, each frame including a payload.

Example 19

This example includes the elements of example 17, wherein the information and/or data are contained in a descriptor that is organized according to a corresponding byte frame format, the byte frame format defining a plurality of fields.

Example 20

This example includes the elements of example 19, wherein each field has an associated defined position in the frame and an associated defined size.

Example 21

This example includes the elements of example 19, wherein the byte frame format is defined according to a byte address field.

Example 22

This example includes the elements of example 19, wherein the descriptor is an human interface device (HID) descriptor and the byte frame format includes a fixed part and a variable part, the fixed part including a number of sensors in a sensor hub, an authentication key, an HID protocol version and a report descriptor length and the variable part including an HID descriptor length, a sensor name, manufacturer, a serial number, a hardware version and a firmware version for each of the number of the sensors.

Example 23

This example includes the elements of example 22, wherein the HID descriptor is provided in response to a request for the HID descriptor.

Example 24

This example includes the elements of example 23, wherein the HID descriptor request includes a request length, an HID usage identifier, a random seed and a cyclic redundancy check (CRC) for the HID descriptor request.

Example 25

This example includes the elements of example 22, wherein an ASCII (American Standard Code for Information Interchange) string corresponding to the sensor name is selected from the group including TEMPERAT, HUMIDITY, LIGHT, SOUND, CO, NO, NO2, SO2, ETO, PM2P5 or PM10.

Example 26

This example includes the elements of example 19, wherein the descriptor is a report descriptor and the byte frame format includes a report descriptor length, report descriptor information that is of variable length and a cyclic redundancy check (CRC) byte.

Example 27

This example includes the elements of example 26, wherein the length of the report descriptor information varies with one or more of sensor name, a sensor manufacturer, a sensor serial number, a sensor module hardware version and/or a sensor module firmware version.

Example 28

This example includes the elements of example 26, wherein the report descriptor information includes one or more of sensor metadata including a report size, a report count, a minimum sensor value, a maximum sensor value, a minimum reporting interval, a sensor manufacturer, a sensor model, a sensor serial number, a sensor description, a sensor unique identifier and/or a human-readable sensor name

Example 29

This example includes the elements of example 26, wherein the report descriptor is provided in response to a request for the report descriptor.

Example 30

This example includes the elements of example 29, wherein the report descriptor request includes a length of the report descriptor request, a report descriptor usage identifier and a CRC (cyclic redundancy check) byte for the report descriptor request.

Example 31

This example includes the elements of example 19, wherein the descriptor is a lifecycle report descriptor and the byte frame format includes a report type, an operation type, a number of reports, a report descriptor length, a report identifier that is specific to each sensor, a sensor state usage identifier configured to denote a sensor state report and an actual sensor state.

Example 32

This example includes the elements of example 19, wherein the descriptor is a sensor data report descriptor and the byte frame format includes a number of reports, an operation type, a report type, a descriptor length and a report identifier.

Example 33

This example includes the elements of example 32, wherein the operation type is selected from the group including a set request and a get request.

Example 34

This example includes the elements of example 33, wherein a get request is a transaction from the sensor module to the sensor processing unit and a set request is a transaction to the sensor module from the sensor processing unit.

Example 35

This example includes the elements of example 33, wherein the set request and the get request have a corresponding byte frame format including a number of reports, an operation type, a report type, a length, a report identifier and a sensor property usage identifier.

Example 36

This example includes the elements of example 32, wherein the report type is selected from the group including input report, output report and feature report.

Example 37

This example includes the elements of example 36, wherein an input report type corresponds to a report that includes one or more of sensor data and/or sensor status, a feature report type corresponds to a get request or a set request related to one or more properties of sensor module and an output report type corresponds to a report utilized by the sensor processing unit for actuation purposes.

Example 38

This example includes the elements of example 1, wherein the sensor controller is to enumerate the sensor during an enumeration phase, following a discovery phase and prior to a reporting phase.

Example 39

This example includes the elements of example 38, wherein the discovery phase is to alert the sensor processing unit that the sensor module is coupled to an associated sensor interface.

Example 40

This example includes the elements of example 38, wherein the discovery phase includes determining an address associated with the sensor module.

Example 41

This example includes the elements of example 38, wherein the enumeration phase is to identify each sensor module that is coupled to an associated sensor interface.

Example 42

According to this example, there is provided a method. The method includes enumerating, by a sensor controller, a sensor to a sensor processing unit.

Example 43

This example includes the elements of example 42, further including reporting, by the sensor controller, a state of the sensor to the sensor processing unit.

Example 44

This example includes the elements of example 42, further including reporting, by the sensor controller, sensor data to the sensor processing unit.

Example 45

This example includes the elements of example 42, wherein the enumerating includes communicating enumeration data to the sensor processing unit, the enumeration data including one or more of a sensor name, a sensor manufacturer name, a sensor serial number, a hardware version, a firmware version, and/or one or more sensor characteristics.

Example 46

This example includes the elements of example 42, wherein the sensor controller is to enumerate the sensor in response to the sensor being powered on.

Example 47

This example includes the elements of example 43, wherein the state is selected from the group including state unknown, ready, not available, no data, initializing, access denied and error.

Example 48

This example includes the elements of example 42, further including storing, by a data store, at least one of enumeration data, lifecycle data and/or sensor data.

Example 49

This example includes the elements of example 42, further including capturing, by the sensor, measurement data corresponding to a value of an environmental parameter and providing, by the sensor, sensor data that is related to the measurement data.

Example 50

This example includes the elements of example 49, further including receiving, by the sensor controller, the sensor data and reporting, by the sensor controller, the sensor data to the sensor processing unit.

Example 51

This example includes the elements of example 42, further including informing, by the sensor controller, the sensor processing unit that it has been connected and what type of sensor it is.

Example 52

This example includes the elements of example 42, further including performing, by a sensor controller, configurable processing on raw sensor observations.

Example 53

This example includes the elements of example 42, further including reporting, by a sensor controller, lifecycle information including state and error information to a sensor application.

Example 54

This example includes the elements of example 45, wherein the sensor characteristics are selected from the group including information related to a type of sensor reading, whether the sensor requires a warm-up time, a frequency at which a sensor captures data, and/or whether sensor data is to be reported when available or at preset time intervals.

Example 55

This example includes the elements of example 42, further including storing, by the sensor controller, at least one of enumeration data, lifecycle data and/or sensor data to a data store.

Example 56

This example includes the elements of example 42, further including utilizing, by the sensor controller, a communication protocol to enable the sensor controller to communicate at least one of enumeration data, lifecycle data and/or sensor data to the sensor processing unit.

Example 57

This example includes the elements of example 56, wherein the communication protocol complies or is compatible with a USB (Universal Serial Bus) HID (Human Interface Device) protocol.

Example 58

This example includes the elements of example 42, further including providing, by the sensor processing unit, at least one of enumeration information, lifecycle information and/or sensor data to a host system.

Example 59

This example includes the elements of example 58, wherein the enumeration information, lifecycle information and/or sensor data is formatted to facilitate ease of viewing by a user.

Example 60

This example includes the elements of example 59, wherein the formatting corresponds to a table format.

Example 61

This example includes the elements of example 42, further including coupling, by a communication link, the sensor processing unit and the sensor module.

Example 62

This example includes the elements of example 61, wherein the communication link complies or is compatible with a serial communication protocol.

Example 63

This example includes the elements of example 62, wherein the serial communication protocol corresponds to an I2C (Inter-integrated circuit) communication protocol.

Example 64

This example includes the elements of example 61, wherein the communication link is to carry one or more frames that comply and/or are compatible with a USB (Universal Serial Bus) HID (Human Interface Device) protocol.

Example 65

This example includes the elements of example 64, wherein each frame includes a payload that contains at least one of enumeration information, lifecycle information and/or sensor data.

Example 66

This example includes the elements of example 42, further including coupling, by a sensor interface, the sensor processing unit to a plurality of sensor modules.

Example 67

This example includes the elements of example 66, further including applying, by the sensor interface, power to a selected sensor module in response to coupling the selected sensor module to the sensor interface or in response to a command from a sensor application.

Example 68

This example includes the elements of example 66, further including controlling, by the sensor processing unit, a multiplexer to select one sensor module of the plurality of sensor modules for communication operations.

Example 69

This example includes the elements of example 66, further including reading, by an input/output (I/O) expander, a stored value to determine which sensor module of a plurality of sensor modules has asserted an interrupt.

Example 70

This example includes the elements of example 42, further including utilizing, by the sensor controller, a communication protocol to communicate at least one of information and/or data to the sensor processing unit.

Example 71

This example includes the elements of example 70, wherein the information and/or data are organized into one or more frames, each frame including a payload.

Example 72

This example includes the elements of example 70, wherein the information and/or data are contained in a descriptor that is organized according to a corresponding byte frame format, the byte frame format defining a plurality of fields.

Example 73

This example includes the elements of example 72, wherein each field has an associated defined position in the frame and an associated defined size.

Example 74

This example includes the elements of example 72, wherein the byte frame format is defined according to a descriptor byte address field.

Example 75

This example includes the elements of example 72, wherein the descriptor is an human interface device (HID) descriptor and the byte frame format includes a fixed part and a variable part, the fixed part including a number of sensors in a sensor hub, an authentication key, an HID protocol version and a report descriptor length and the variable part including an HID descriptor length, a sensor name, manufacturer, a serial number, a hardware version and a firmware version for each of the number of the sensors.

Example 76

This example includes the elements of example 75, wherein the HID descriptor is provided in response to a request for the HID descriptor.

Example 77

This example includes the elements of example 76, wherein the HID descriptor request includes a request length, an HID usage identifier, a random seed and a cyclic redundancy check (CRC) for the HID descriptor request.

Example 78

This example includes the elements of example 75, wherein an ASCII (American Standard Code for Information Interchange) string corresponding to the sensor name is selected from the group including TEMPERAT, HUMIDITY, LIGHT, SOUND, CO, NO, NO2, SO2, ETO, PM2P5 or PM10.

Example 79

This example includes the elements of example 72, wherein the descriptor is a report descriptor and the byte frame format includes a report descriptor length, report descriptor information that is of variable length and a cyclic redundancy check (CRC) byte.

Example 80

This example includes the elements of example 79, wherein the length of the report descriptor information varies with one or more of sensor name, a sensor manufacturer, a sensor serial number, a sensor module hardware version and/or a sensor module firmware version.

Example 81

This example includes the elements of example 79, wherein the report descriptor information includes one or more of sensor metadata including a report size, a report count, a minimum sensor value, a maximum sensor value, a minimum reporting interval, a sensor manufacturer, a sensor model, a sensor serial number, a sensor description, a sensor unique identifier and/or a human-readable sensor name Example 82

This example includes the elements of example 79, wherein the report descriptor is provided in response to a request for the report descriptor.

Example 83

This example includes the elements of example 82, wherein the report descriptor request includes a length of the report descriptor request, a report descriptor usage identifier and a CRC (cyclic redundancy check) byte for the report descriptor request.

Example 84

This example includes the elements of example 72, wherein the descriptor is a lifecycle report descriptor and the byte frame format includes a report type, an operation type, a number of reports, a report descriptor length, a report identifier that is specific to each sensor, a sensor state usage identifier configured to denote a sensor state report and an actual sensor state.

Example 85

This example includes the elements of example 72, wherein the descriptor is a sensor data report descriptor and the byte frame format includes a number of reports, an operation type, a report type, a descriptor length and a report identifier.

Example 86

This example includes the elements of example 85, wherein the operation type is selected from the group including a set request and a get request.

Example 87

This example includes the elements of example 86, wherein a get request is a transaction from the sensor module to the sensor processing unit and a set request is a transaction to the sensor module from the sensor processing unit.

Example 88

This example includes the elements of example 86, wherein the set request and the get request have a corresponding byte frame format including a number of reports, an operation type, a report type, a length, a report identifier and a sensor property usage identifier.

Example 89

This example includes the elements of example 85, wherein the report type is selected from the group including input report, output report and feature report.

Example 90

This example includes the elements of example 89, wherein an input report type corresponds to a report that includes one or more of sensor data and/or sensor status, a feature report type corresponds to a get request or a set request related to one or more properties of sensor module and an output report type corresponds to a report utilized by the sensor processing unit for actuation purposes.

Example 91

This example includes the elements of example 42, further including enumerating, by the sensor controller, the sensor during an enumeration phase, following a discovery phase and prior to a reporting phase.

Example 92

This example includes the elements of example 91, wherein the discovery phase is to alert the sensor processing unit that the sensor module is coupled to an associated sensor interface.

Example 93

This example includes the elements of example 91, wherein the discovery phase includes determining an address associated with the sensor module.

Example 94

This example includes the elements of example 91, wherein the enumeration phase is to identify each sensor module that is coupled to an associated sensor interface.

Example 95

According to this example there is provided a system. The system includes a sensor processing unit and a sensor module. The sensor module includes a sensor, and a sensor controller. The sensor controller is to enumerate the sensor to the sensor processing unit.

Example 96

This example includes the elements of example 95, wherein the sensor controller is further to report a state of the sensor to the sensor processing unit.

Example 97

This example includes the elements of example 95, wherein the sensor controller is further to report sensor data to the sensor processing unit.

Example 98

This example includes the elements according to any one of examples 95 through 97, wherein the enumerating includes communicating enumeration data to the sensor processing unit, the enumeration data including one or more of a sensor name, a sensor manufacturer name, a sensor serial number, a hardware version, a firmware version, and/or one or more sensor characteristics.

Example 99

This example includes the elements according to any one of examples 95 through 97, wherein the sensor controller is to enumerate the sensor in response to the sensor being powered on.

Example 100

This example includes the elements of example 96, wherein the state is selected from the group including state unknown, ready, not available, no data, initializing, access denied and error.

Example 101

This example includes the elements according to any one of examples 95 through 97, wherein the sensor controller includes a data store to store at least one of enumeration data, lifecycle data and/or sensor data.

Example 102

This example includes the elements according to any one of examples 95 through 97, wherein the sensor is to capture measurement data corresponding to a value of an environmental parameter and to provide sensor data that is related to the measurement data.

Example 103

This example includes the elements of example 102, wherein the sensor controller is to receive the sensor data and to report the sensor data to the sensor processing unit.

Example 104

This example includes the elements according to any one of examples 95 through 97, wherein the sensor controller is to inform the sensor processing unit that it has been connected and what type of sensor it is.

Example 105

This example includes the elements according to any one of examples 95 through 97, wherein the sensor controller is to utilize a communication protocol to enable the sensor controller to communicate at least one of enumeration data, lifecycle data and/or sensor data to the sensor processing unit.

Example 106

This example includes the elements of example 105, wherein the communication protocol complies or is compatible with a USB (Universal Serial Bus) HID (Human Interface Device) protocol.

Example 107

This example includes the elements according to any one of examples 95 through 97, wherein the sensor controller is to perform configurable processing on raw sensor observations.

Example 108

This example includes the elements according to any one of examples 95 through 97, wherein the sensor controller is to report lifecycle information including state and error information to a sensor application.

Example 109

This example includes the elements of example 95, wherein the sensor processing unit is to provide at least one of enumeration information, lifecycle information and/or sensor data to host system.

Example 110

This example includes the elements of example 109, wherein the enumeration information, lifecycle information and/or sensor data is formatted to facilitate ease of viewing by a user.

Example 111

This example includes the elements of example 110, wherein the formatting corresponds to a table format.

Example 112

This example includes the elements of example 98, wherein the sensor characteristics are selected from the group including information related to a type of sensor reading, whether the sensor requires a warm-up time, a frequency at which a sensor captures data, and/or whether sensor data is to be reported when available or at preset time intervals.

Example 113

This example includes the elements of example 95, further including a communication link to couple the sensor processing unit and the sensor module.

Example 114

This example includes the elements of example 113, wherein the communication link complies or is compatible with a serial communication protocol.

Example 115

This example includes the elements of example 114, wherein the serial communication protocol corresponds to an I2C (Inter-integrated circuit) communication protocol.

Example 116

This example includes the elements of example 113, wherein the communication link is to carry one or more frames that comply and/or are compatible with a USB (Universal Serial Bus) HID (Human Interface Device) protocol.

Example 117

This example includes the elements of example 116, wherein each frame includes a payload that contains at least one of enumeration information, lifecycle information and/or sensor data.

Example 118

This example includes the elements of example 95, further including a sensor interface to couple the sensor processing unit to a plurality of sensor modules.

Example 119

This example includes the elements of example 118, wherein the sensor interface includes a multiplexer and an input/output (I/O) expander.

Example 120

This example includes the elements of example 119, wherein the sensor processing unit is to control the multiplexer to select one sensor module of a plurality of sensor modules for communication operations.

Example 121

This example includes the elements of example 119, wherein the I/O expander is to read a stored value to determine which sensor module of a plurality of sensor modules has asserted an interrupt.

Example 122

This example includes the elements of example 118, wherein the sensor interface is to apply power to a selected sensor module in response to coupling the selected sensor module to the sensor interface.

Example 123

This example includes the elements of example 118, wherein the sensor interface is to apply power to a selected sensor module in response to a command from a sensor application.

Example 124

This example includes the elements according to any one of examples 95 through 97, wherein the sensor controller is to enumerate the sensor during an enumeration phase, following a discovery phase and prior to a reporting phase.

Example 125

This example includes the elements of example 124, wherein the discovery phase is to alert the sensor processing unit that the sensor module is coupled to an associated sensor interface.

Example 126

This example includes the elements of example 124, wherein the discovery phase includes determining an address associated with the sensor module.

Example 127

This example includes the elements of example 124, wherein the enumeration phase is to identify each sensor module that is coupled to an associated sensor interface.

Example 128

This example includes the elements according to any one of examples 95 through 97, wherein the sensor controller is to utilize a communication protocol to communicate at least one of information and/or data to the sensor processing unit.

Example 129

This example includes the elements of example 128, wherein the information and/or data are organized into one or more frames, each frame including a payload.

Example 130

This example includes the elements of example 128, wherein the information and/or data are contained in a descriptor that is organized according to a corresponding byte frame format, the byte frame format defining a plurality of fields.

Example 131

This example includes the elements of example 130, wherein each field has an associated defined position in the frame and an associated defined size.

Example 132

This example includes the elements of example 130, wherein the byte frame format is defined according to a descriptor byte address field.

Example 133

This example includes the elements of example 130, wherein the descriptor is an human interface device (HID) descriptor and the byte frame format includes a fixed part and a variable part, the fixed part including a number of sensors in a sensor hub, an authentication key, an HID protocol version and a report descriptor length and the variable part including an HID descriptor length, a sensor name, manufacturer, a serial number, a hardware version and a firmware version for each of the number of the sensors.

Example 134

This example includes the elements of example 133, wherein the HID descriptor is provided in response to a request for the HID descriptor.

Example 135

This example includes the elements of example 134, wherein the HID descriptor request includes a request length, an HID usage identifier, a random seed and a cyclic redundancy check (CRC) for the HID descriptor request.

Example 136

This example includes the elements of example 133, wherein an ASCII (American Standard Code for Information Interchange) string corresponding to the sensor name is selected from the group including TEMPERAT, HUMIDITY, LIGHT, SOUND, CO, NO, NO2, SO2, ETO, PM2P5 or PM10.

Example 137

This example includes the elements of example 130, wherein the descriptor is a report descriptor and the byte frame format includes a report descriptor length, report descriptor information that is of variable length and a cyclic redundancy check (CRC) byte.

Example 138

This example includes the elements of example 137, wherein the length of the report descriptor information varies with one or more of sensor name, a sensor manufacturer, a sensor serial number, a sensor module hardware version and/or a sensor module firmware version.

Example 139

This example includes the elements of example 137, wherein the report descriptor information includes one or more of sensor metadata including a report size, a report count, a minimum sensor value, a maximum sensor value, a minimum reporting interval, a sensor manufacturer, a sensor model, a sensor serial number, a sensor description, a sensor unique identifier and/or a human-readable sensor name

Example 140

This example includes the elements of example 137, wherein the report descriptor is provided in response to a request for the report descriptor.

Example 141

This example includes the elements of example 140, wherein the report descriptor request includes a length of the report descriptor request, a report descriptor usage identifier and a CRC (cyclic redundancy check) byte for the report descriptor request.

Example 142

This example includes the elements of example 130, wherein the descriptor is a lifecycle report descriptor and the byte frame format includes a report type, an operation type, a number of reports, a report descriptor length, a report identifier that is specific to each sensor, a sensor state usage identifier configured to denote a sensor state report and an actual sensor state.

Example 143

This example includes the elements of example 130, wherein the descriptor is a sensor data report descriptor and the byte frame format includes a number of reports, an operation type, a report type, a descriptor length and a report identifier.

Example 144

This example includes the elements of example 143, wherein the operation type is selected from the group including a set request and a get request.

Example 145

This example includes the elements of example 144, wherein a get request is a transaction from the sensor module to the sensor processing unit and a set request is a transaction to the sensor module from the sensor processing unit.

Example 146

This example includes the elements of example 144, wherein the set request and the get request have a corresponding byte frame format including a number of reports, an operation type, a report type, a length, a report identifier and a sensor property usage identifier.

Example 147

This example includes the elements of example 143, wherein the report type is selected from the group including input report, output report and feature report.

Example 148

This example includes the elements of example 147, wherein an input report type corresponds to a report that includes one or more of sensor data and/or sensor status, a feature report type corresponds to a get request or a set request related to one or more properties of sensor module and an output report type corresponds to a report utilized by the sensor processing unit for actuation purposes.

Example 149

This example includes the elements of example 143, wherein the report identifier corresponds to a sensor to capture measurement data corresponding to an environmental parameter selected from the group comprising CO, SO2, NO2, NOx, CO2, NO2, PM2.5, PM10, temperature, humidity, sound, light and ETO.

Example 150

According to this example, there is provided a computer readable storage device. The computer readable storage device has stored thereon instructions that when executed by one or more processors result in the following operations including enumerating a sensor to a sensor processing unit.

Example 151

This example includes the elements of example 150, wherein the instructions that when executed by one or more processors results in the following additional operations including reporting a state of the sensor to the sensor processing unit.

Example 152

This example includes the elements of example 150, wherein the instructions that when executed by one or more processors results in the following additional operations including reporting sensor data to the sensor processing unit.

Example 153

This example includes the elements according to any one of examples 150 through 152, wherein the enumerating includes communicating enumeration data to the sensor processing unit, the enumeration data including one or more of a sensor name, a sensor manufacturer name, a sensor serial number, a hardware version, a firmware version, and/or one or more sensor characteristics.

Example 154

This example includes the elements according to any one of examples 150 through 152, wherein the sensor controller is to enumerate the sensor in response to the sensor being powered on.

Example 155

This example includes the elements of example 151, wherein the state is selected from the group including state unknown, ready, not available, no data, initializing, access denied and error.

Example 156

This example includes the elements according to any one of examples 150 through 152, wherein the instructions that when executed by one or more processors results in the following additional operations including storing at least one of enumeration data, lifecycle data and/or sensor data.

Example 157

This example includes the elements according to any one of examples 150 through 152, wherein the instructions that when executed by one or more processors results in the following additional operations including capturing measurement data corresponding to a value of an environmental parameter and providing sensor data that is related to the measurement data.

Example 158

This example includes the elements of example 157, wherein the instructions that when executed by one or more processors results in the following additional operations including receiving the sensor data and reporting the sensor data to the sensor processing unit.

Example 159

This example includes the elements according to any one of examples 150 through 152, wherein the instructions that when executed by one or more processors results in the following additional operations including informing the sensor processing unit that it has been connected and what type of sensor it is.

Example 160

This example includes the elements according to any one of examples 150 through 152, wherein the instructions that when executed by one or more processors results in the following additional operations including performing configurable processing on raw sensor observations.

Example 161

This example includes the elements according to any one of examples 150 through 152, wherein the instructions that when executed by one or more processors results in the following additional operations including reporting lifecycle information including state and error information to a sensor application.

Example 162

This example includes the elements of example 153, wherein the sensor characteristics are selected from the group including information related to a type of sensor reading, whether the sensor requires a warm-up time, a frequency at which a sensor captures data, and/or whether sensor data is to be reported when available or at preset time intervals.

Example 163

This example includes the elements according to any one of examples 150 through 152, wherein the instructions that when executed by one or more processors results in the following additional operations including storing at least one of enumeration data, lifecycle data and/or sensor data to a data store.

Example 164

This example includes the elements according to any one of examples 150 through 152, wherein the instructions that when executed by one or more processors results in the following additional operations including utilizing a communication protocol to enable the sensor controller to communicate at least one of enumeration data, lifecycle data and/or sensor data to the sensor processing unit.

Example 165

This example includes the elements of example 164, wherein the communication protocol complies or is compatible with a USB (Universal Serial Bus) HID (Human Interface Device) protocol.

Example 166

This example includes the elements according to any one of examples 150 through 152, wherein the instructions that when executed by one or more processors results in the following additional operations including providing at least one of enumeration information, lifecycle information and/or sensor data to a host system.

Example 167

This example includes the elements of example 166, wherein the enumeration information, lifecycle information and/or sensor data is formatted to facilitate ease of viewing by a user.

Example 168

This example includes the elements of example 157, wherein the formatting corresponds to a table format.

Example 169

This example includes the elements according to any one of examples 150 through 152, wherein the instructions that when executed by one or more processors results in the following additional operations including coupling the sensor processing unit and the sensor module for communication.

Example 170

This example includes the elements of example 169, wherein the communication complies or is compatible with a serial communication protocol.

Example 171

This example includes the elements of example 170, wherein the serial communication protocol corresponds to an I2C (Inter-integrated circuit) communication protocol.

Example 172

This example includes the elements of example 169, wherein the communication includes one or more frames that comply and/or are compatible with a USB (Universal Serial Bus) HID (Human Interface Device) protocol.

Example 173

This example includes the elements of example 172, wherein each frame includes a payload that contains at least one of enumeration information, lifecycle information and/or sensor data.

Example 174

This example includes the elements according to any one of examples 150 through 152, wherein the instructions that when executed by one or more processors results in the following additional operations including coupling the sensor processing unit to a plurality of sensor modules.

Example 175

This example includes the elements of example 174, wherein the instructions that when executed by one or more processors results in the following additional operations including applying power to a selected sensor module in response to coupling the selected sensor module to the sensor interface or in response to a command from a sensor application.

Example 176

This example includes the elements of example 174, wherein the instructions that when executed by one or more processors results in the following additional operations including controlling a multiplexer to select one sensor module of the plurality of sensor modules for communication operations.

Example 177

This example includes the elements of example 174, wherein the instructions that when executed by one or more processors results in the following additional operations including reading a stored value to determine which sensor module of a plurality of sensor modules has asserted an interrupt.

Example 178

This example includes the elements according to any one of examples 150 through 152, wherein the instructions that when executed by one or more processors results in the following additional operations including utilizing a communication protocol to communicate at least one of information and/or data to the sensor processing unit.

Example 179

This example includes the elements of example 178, wherein the information and/or data are organized into one or more frames, each frame including a payload.

Example 180

This example includes the elements of example 178, wherein the information and/or data are contained in a descriptor that is organized according to a corresponding byte frame format, the byte frame format defining a plurality of fields.

Example 181

This example includes the elements of example 180, wherein each field has an associated defined position in the frame and an associated defined size.

Example 182

This example includes the elements of example 180, wherein the byte frame format is defined according to a descriptor byte address field.

Example 183

This example includes the elements of example 180, wherein the descriptor is an human interface device (HID) descriptor and the byte frame format includes a fixed part and a variable part, the fixed part including a number of sensors in a sensor hub, an authentication key, an HID protocol version and a report descriptor length and the variable part including an HID descriptor length, a sensor name, manufacturer, a serial number, a hardware version and a firmware version for each of the number of the sensors.

Example 184

This example includes the elements of example 183, wherein the HID descriptor is provided in response to a request for the HID descriptor.

Example 185

This example includes the elements of example 184, wherein the HID descriptor request includes a request length, an HID usage identifier, a random seed and a cyclic redundancy check (CRC) for the HID descriptor request.

Example 186

This example includes the elements of example 183, wherein an ASCII (American Standard Code for Information Interchange) string corresponding to the sensor name is selected from the group including TEMPERAT, HUMIDITY, LIGHT, SOUND, CO, NO, NO2, SO2, ETO, PM2P5 or PM10.

Example 187

This example includes the elements of example 180, wherein the descriptor is a report descriptor and the byte frame format includes a report descriptor length, report descriptor information that is of variable length and a cyclic redundancy check (CRC) byte.

Example 188

This example includes the elements of example 187, wherein the length of the report descriptor information varies with one or more of sensor name, a sensor manufacturer, a sensor serial number, a sensor module hardware version and/or a sensor module firmware version.

Example 189

This example includes the elements of example 187, wherein the report descriptor information includes one or more of sensor metadata including a report size, a report count, a minimum sensor value, a maximum sensor value, a minimum reporting interval, a sensor manufacturer, a sensor model, a sensor serial number, a sensor description, a sensor unique identifier and/or a human-readable sensor name Example 190

This example includes the elements of example 187, wherein the report descriptor is provided in response to a request for the report descriptor.

Example 191

This example includes the elements of example 190, wherein the report descriptor request includes a length of the report descriptor request, a report descriptor usage identifier and a CRC (cyclic redundancy check) byte for the report descriptor request.

Example 192

This example includes the elements of example 180, wherein the descriptor is a lifecycle report descriptor and the byte frame format includes a report type, an operation type, a number of reports, a report descriptor length, a report identifier that is specific to each sensor, a sensor state usage identifier configured to denote a sensor state report and an actual sensor state.

Example 193

This example includes the elements of example 180, wherein the descriptor is a sensor data report descriptor and the byte frame format includes a number of reports, an operation type, a report type, a descriptor length and a report identifier.

Example 194

This example includes the elements of example 193, wherein the operation type is selected from the group including a set request and a get request.

Example 195

This example includes the elements of example 194, wherein a get request is a transaction from the sensor module to the sensor processing unit and a set request is a transaction to the sensor module from the sensor processing unit.

Example 196

This example includes the elements of example 194, wherein the set request and the get request have a corresponding byte frame format including a number of reports, an operation type, a report type, a length, a report identifier and a sensor property usage identifier.

Example 197

This example includes the elements of example 193, wherein the report type is selected from the group including input report, output report and feature report.

Example 198

This example includes the elements of example 197, wherein an input report type corresponds to a report that includes one or more of sensor data and/or sensor status, a feature report type corresponds to a get request or a set request related to one or more properties of sensor module and an output report type corresponds to a report utilized by the sensor processing unit for actuation purposes.

Example 199

This example includes the elements according to any one of examples 150 through 152, wherein the instructions that when executed by one or more processors results in the following additional operations including enumerating the sensor during an enumeration phase, following a discovery phase and prior to a reporting phase.

Example 200

This example includes the elements of example 199, wherein the discovery phase is to alert the sensor processing unit that the sensor module is coupled to an associated sensor interface.

Example 201

This example includes the elements of example 199, wherein the discovery phase includes determining an address associated with the sensor module.

Example 202

This example includes the elements of example 199, wherein the enumeration phase is to identify each sensor module that is coupled to an associated sensor interface.

Example 203

According to this example, there is provided a device. The device includes means for enumerating, by a sensor controller, a sensor to a sensor processing unit.

Example 204

This example includes the elements of example 203, further including means for reporting, by the sensor controller, a state of the sensor to the sensor processing unit.

Example 205

This example includes the elements of example 203, further including means for reporting, by the sensor controller, sensor data to the sensor processing unit.

Example 206

This example includes the elements according to any one of examples 203 through 205, wherein the enumerating includes communicating enumeration data to the sensor processing unit, the enumeration data including one or more of a sensor name, a sensor manufacturer name, a sensor serial number, a hardware version, a firmware version, and/or one or more sensor characteristics.

Example 207

This example includes the elements according to any one of examples 203 through 205, wherein the sensor controller is to enumerate the sensor in response to the sensor being powered on.

Example 208

This example includes the elements of example 204, wherein the state is selected from the group including state unknown, ready, not available, no data, initializing, access denied and error.

Example 209

This example includes the elements according to any one of examples 203 through 205, further including means for storing, by a data store, at least one of enumeration data, lifecycle data and/or sensor data.

Example 210

This example includes the elements according to any one of examples 203 through 205, further including means for capturing, by the sensor, measurement data corresponding to a value of an environmental parameter and means for providing, by the sensor, sensor data that is related to the measurement data.

Example 211

This example includes the elements of example 210, further including means for receiving, by the sensor controller, the sensor data and means for reporting, by the sensor controller, the sensor data to the sensor processing unit.

Example 212

This example includes the elements according to any one of examples 203 through 205, further including means for informing, by the sensor controller, the sensor processing unit that it has been connected and what type of sensor it is.

Example 213

This example includes the elements according to any one of examples 203 through 205, further including means for performing, by the sensor controller, configurable processing on raw sensor observations.

Example 214

This example includes the elements according to any one of examples 203 through 205, further including means for reporting, by the sensor controller, lifecycle information including state and error information to a sensor application.

Example 215

This example includes the elements of example 206, wherein the sensor characteristics are selected from the group including information related to a type of sensor reading, whether the sensor requires a warm-up time, a frequency at which a sensor captures data, and/or whether sensor data is to be reported when available or at preset time intervals.

Example 216

This example includes the elements according to any one of examples 203 through 205, further including means for storing, by the sensor controller, at least one of enumeration data, lifecycle data and/or sensor data to a data store.

Example 217

This example includes the elements according to any one of examples 203 through 205, further including means for utilizing, by the sensor controller, a communication protocol to enable the sensor controller to communicate at least one of enumeration data, lifecycle data and/or sensor data to the sensor processing unit.

Example 218

This example includes the elements of example 217, wherein the communication protocol complies or is compatible with a USB (Universal Serial Bus) HID (Human Interface Device) protocol.

Example 219

This example includes the elements according to any one of examples 203 through 205, further including means for providing, by the sensor processing unit, at least one of enumeration information, lifecycle information and/or sensor data to a host system.

Example 220

This example includes the elements of example 219, wherein the enumeration information, lifecycle information and/or sensor data is formatted to facilitate ease of viewing by a user.

Example 221

This example includes the elements of example 220, wherein the formatting corresponds to a table format.

Example 222

This example includes the elements according to any one of examples 203 through 205, further including means for coupling, by a communication link, the sensor processing unit and the sensor module.

Example 223

This example includes the elements of example 222, wherein the communication link complies or is compatible with a serial communication protocol.

Example 224

This example includes the elements of example 223, wherein the serial communication protocol corresponds to an I2C (Inter-integrated circuit) communication protocol.

Example 225

This example includes the elements of example 222, wherein the communication link is to carry one or more frames that comply and/or are compatible with a USB (Universal Serial Bus) HID (Human Interface Device) protocol.

Example 226

This example includes the elements of example 225, wherein each frame includes a payload that contains at least one of enumeration information, lifecycle information and/or sensor data.

Example 227

This example includes the elements according to any one of examples 203 through 205, further including means for coupling, by a sensor interface, the sensor processing unit to a plurality of sensor modules.

Example 228

This example includes the elements of example 227, further including means for applying, by the sensor interface, power to a selected sensor module in response to coupling the selected sensor module to the sensor interface or in response to a command from a sensor application.

Example 229

This example includes the elements of example 227, further including means for controlling, by the sensor processing unit, a multiplexer to select one sensor module of the plurality of sensor modules for communication operations.

Example 230

This example includes the elements of example 227, further including means for reading, by an input/output (I/O) expander, a stored value to determine which sensor module of a plurality of sensor modules has asserted an interrupt.

Example 231

This example includes the elements according to any one of examples 203 through 205, further including means for utilizing, by the sensor controller, a communication protocol to communicate at least one of information and/or data to the sensor processing unit.

Example 232

This example includes the elements of example 231, wherein the information and/or data are organized into one or more frames, each frame including a payload.

Example 233

This example includes the elements of example 231, wherein the information and/or data are contained in a descriptor that is organized according to a corresponding byte frame format, the byte frame format defining a plurality of fields.

Example 234

This example includes the elements of example 233, wherein each field has an associated defined position in the frame and an associated defined size.

Example 235

This example includes the elements of example 233, wherein the byte frame format is defined according to a descriptor byte address field.

Example 236

This example includes the elements of example 233, wherein the descriptor is an human interface device (HID) descriptor and the byte frame format includes a fixed part and a variable part, the fixed part including a number of sensors in a sensor hub, an authentication key, an HID protocol version and a report descriptor length and the variable part including an HID descriptor length, a sensor name, manufacturer, a serial number, a hardware version and a firmware version for each of the number of the sensors.

Example 237

This example includes the elements of example 236, wherein the HID descriptor is provided in response to a request for the HID descriptor.

Example 238

This example includes the elements of example 237, wherein the HID descriptor request includes a request length, an HID usage identifier, a random seed and a cyclic redundancy check (CRC) for the HID descriptor request.

Example 239

This example includes the elements of example 236, wherein an ASCII (American Standard Code for Information Interchange) string corresponding to the sensor name is selected from the group including TEMPERAT, HUMIDITY, LIGHT, SOUND, CO, NO, NO2, SO2, ETO, PM2P5 or PM10.

Example 240

This example includes the elements of example 233, wherein the descriptor is a report descriptor and the byte frame format includes a report descriptor length, report descriptor information that is of variable length and a cyclic redundancy check (CRC) byte.

Example 241

This example includes the elements of example 240, wherein the length of the report descriptor information varies with one or more of sensor name, a sensor manufacturer, a sensor serial number, a sensor module hardware version and/or a sensor module firmware version.

Example 242

This example includes the elements of example 240, wherein the report descriptor information includes one or more of sensor metadata including a report size, a report count, a minimum sensor value, a maximum sensor value, a minimum reporting interval, a sensor manufacturer, a sensor model, a sensor serial number, a sensor description, a sensor unique identifier and/or a human-readable sensor name Example 243

This example includes the elements of example 240, wherein the report descriptor is provided in response to a request for the report descriptor.

Example 244

This example includes the elements of example 243, wherein the report descriptor request includes a length of the report descriptor request, a report descriptor usage identifier and a CRC (cyclic redundancy check) byte for the report descriptor request.

Example 245

This example includes the elements of example 233, wherein the descriptor is a lifecycle report descriptor and the byte frame format includes a report type, an operation type, a number of reports, a report descriptor length, a report identifier that is specific to each sensor, a sensor state usage identifier configured to denote a sensor state report and an actual sensor state.

Example 246

This example includes the elements of example 233, wherein the descriptor is a sensor data report descriptor and the byte frame format includes a number of reports, an operation type, a report type, a descriptor length and a report identifier.

Example 247

This example includes the elements of example 246, wherein the operation type is selected from the group including a set request and a get request.

Example 248

This example includes the elements of example 247, wherein a get request is a transaction from the sensor module to the sensor processing unit and a set request is a transaction to the sensor module from the sensor processing unit.

Example 249

This example includes the elements of example 247, wherein the set request and the get request have a corresponding byte frame format including a number of reports, an operation type, a report type, a length, a report identifier and a sensor property usage identifier.

Example 250

This example includes the elements of example 246, wherein the report type is selected from the group including input report, output report and feature report.

Example 251

This example includes the elements of example 250, wherein an input report type corresponds to a report that includes one or more of sensor data and/or sensor status, a feature report type corresponds to a get request or a set request related to one or more properties of sensor module and an output report type corresponds to a report utilized by the sensor processing unit for actuation purposes.

Example 252

This example includes the elements according to any one of examples 203 through 205, further including means for enumerating, by the sensor controller, the sensor during an enumeration phase, following a discovery phase and prior to a reporting phase.

Example 253

This example includes the elements of example 252, wherein the discovery phase is to alert the sensor processing unit that the sensor module is coupled to an associated sensor interface.

Example 254

This example includes the elements of example 252, wherein the discovery phase includes determining an address associated with the sensor module.

Example 255

This example includes the elements of example 252, wherein the enumeration phase is to identify each sensor module that is coupled to an associated sensor interface.

Example 256

According to this example, there is provided a system. The system includes at least one device arranged to perform the method of any one of claims 42 to 94.

Example 257

According to this example, there is provided a device. The device includes means to perform the method of any one of claims 42 to 94.

Example 258

According to this example, there is provided a computer readable storage device. The computer readable storage device has stored thereon instructions that when executed by one or more processors result in the following operations including the method according to any one of claims 42 to 94.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A sensor lifecycle management apparatus comprising:
   a sensor processing unit; and
   a sensor module comprising:
      a sensor; and
      a sensor controller to communicate, to the sensor processing unit, enumeration data using an enumeration descriptor, lifecycle data using a lifecycle report descriptor, and sensor data using a sensor data report;
   wherein, the enumeration descriptor comprises:
      an 8-byte sensor name field used by the sensor processing unit to identify the sensor based on a sensor type;
      a 6-byte serial number field used by the sensor processing unit to identify the sensor based on a sensor serial number; and
      a 2-byte authentication key field used by the sensor processing unit to authenticate the specific sensor module that is reporting the enumeration descriptor and permit that sensor module to commence normal operation;
   wherein, the sensor module generates a unique 2-byte authentication key field by performing an exclusive-OR operation using a lower two bytes of the sensor serial number associated with that sensor module and a random seed provided by the sensor processing unit; and
   wherein, the lifecycle report descriptor comprises:
      a 1-byte sensor-specific report ID field used by the sensor processing unit to identify which sensor is reporting data;
      a 2-byte sensor state usage ID field used by the sensor processing unit to identify that the type of data being reported is the lifecycle data; and
      a 2-byte actual sensor state field used by the sensor processing unit to determine whether the sensor currently reporting lifecycle data is ready to present sensor data.

2. The apparatus of claim 1, wherein the sensor controller is to utilize a communication protocol to enable the sensor controller to communicate at least one of enumeration data, lifecycle data and/or sensor data to the sensor processing unit.

3. The apparatus of claim 2, wherein the communication protocol complies or is compatible with a USB (Universal Serial Bus) HID (Human Interface Device) protocol.

4. The apparatus of claim 1, wherein the actual sensor state is selected from the group comprising state unknown, ready, not available, no data, initializing, access denied and error.

5. The apparatus of claim 1, wherein the sensor controller comprises a data store to store at least one of enumeration data, lifecycle data and/or sensor data.

6. A computer readable storage device having stored thereon instructions that when executed by one or more processors result in the following operations comprising:
   communicate, to a sensor processing unit, by a sensor module comprising a sensor and a sensor controller, enumeration data using an enumeration descriptor;
   wherein, enumeration descriptor comprises:
      an 8-byte sensor name field used by the sensor processing unit to identify the sensor based on a sensor type;
      a 6-byte serial number field used by the sensor processing unit to identify the sensor based on a sensor serial number; and
      a 2-byte authentication key field used by the sensor processing unit to authenticate the specific sensor module that is reporting the enumeration descriptor and permit that sensor module to commence normal operation;
   wherein, the sensor module generates a unique 2-byte authentication key field by performing an exclusive-OR operation using a lower two bytes of the sensor serial number associated with that sensor module and a random seed provided by the sensor processing unit; and
   communicate, to the sensor processing unit, by the sensor module, lifecycle data using a lifecycle report descriptor;
   wherein, the lifecycle report descriptor comprises:
      a 1-byte sensor-specific report ID field used by the sensor processing unit to identify which sensor is reporting data;
      a 2-byte sensor state usage ID field used by the sensor processing unit to identify that the type of data being reported is the lifecycle data; and
      a 2-byte actual sensor state field used by the sensor processing unit to determine whether the sensor currently reporting lifecycle data is ready to present sensor data;
   communicate, to the sensor processing unit, by the sensor module, sensor data using a sensor data report.

7. The computer readable storage device of claim 6 having stored thereon instructions that when executed by the one or more processors result in the following additional operations report, by the sensor controller, a communication protocol to enable the sensor controller to communicate at least one of enumeration data, lifecycle data and/or sensor data to the sensor processing unit.

8. The computer readable storage device of claim 7, wherein the communication protocol complies or is compatible with a USB (Universal Serial Bus) HID (Human Interface Device) protocol.

9. The computer readable storage device of claim 6, wherein the actual sensor state is selected from the group comprising state unknown, ready, not available, no data, initializing, access denied and error.

10. The computer readable storage device of claim 6 having stored thereon instructions that when executed by the one or more processors result in the following additional operations report, comprising storing, by a data store, at least one of enumeration data, lifecycle data and/or sensor data.

11. A sensor lifecycle management system comprising:
   a sensor processing unit; and
   a sensor module comprising:
      a sensor; and
      a sensor controller to communicate, to the sensor processing unit, enumeration data using an enumeration descriptor, lifecycle data using a lifecycle report descriptor, and sensor data using a sensor data report;
   wherein, the enumeration descriptor comprises:
      an 8-byte sensor name field used by the sensor processing unit to identify the sensor based on a sensor type;
      a 6-byte serial number field used by the sensor processing unit to identify the sensor based on a sensor serial number; and
      a 2-byte authentication key field used by the sensor processing unit to authenticate the specific sensor module that is reporting the enumeration descriptor and permit that sensor module to commence normal operation;
   wherein, the sensor module generates a unique 2-byte authentication key field by performing an exclusive-OR operation using a lower two bytes of the sensor serial number associated with that sensor module and a random seed provided by the sensor processing unit; and
   wherein, the lifecycle report descriptor comprises:
      a 1-byte sensor-specific report ID field used by the sensor processing unit to identify which sensor is reporting data;
      a 2-byte sensor state usage ID field used by the sensor processing unit to identify that the type of data being reported is the lifecycle data; and
      a 2-byte actual sensor state field used by the sensor processing unit to determine whether the sensor currently reporting lifecycle data is ready to present sensor data.

12. The system according to claim 11, wherein the sensor controller is to utilize a communication protocol to enable the sensor controller to communicate at least one of enumeration data, lifecycle data and/or sensor data to the sensor processing unit.

13. The system of claim 12, wherein the communication protocol complies or is compatible with a USB (Universal Serial Bus) HID (Human Interface Device) protocol.

14. The system of claim 11 wherein the actual sensor state is selected from the group comprising state unknown, ready, not available, no data, initializing, access denied and error.

15. The system according to claim 11, wherein the sensor controller comprises a data store to store at least one of enumeration data, lifecycle data and/or sensor data.

* * * * *